US010479109B2

(12) United States Patent
Wong et al.

(10) Patent No.: US 10,479,109 B2
(45) Date of Patent: Nov. 19, 2019

(54) AUTOMATIC FACIAL MAKEUP METHOD

(71) Applicant: Zong Jing Investment, Inc., Taipei (TW)

(72) Inventors: Charlene Hsueh-Ling Wong, Taipei (TW); Yi-Hsueh Yang, Taipei (TW)

(73) Assignee: ZONG JING INVESTMENT, INC., Taipei (TW)

(*) Notice: Subject to any disclaimer, the term of this patent is extended or adjusted under 35 U.S.C. 154(b) by 0 days.

(21) Appl. No.: 15/608,173

(22) Filed: May 30, 2017

(65) Prior Publication Data

US 2017/0348982 A1    Dec. 7, 2017

(30) Foreign Application Priority Data

Jun. 2, 2016  (TW) .............................. 105117476 A

(51) Int. Cl.
*A45D 44/00* (2006.01)
*G06K 9/00* (2006.01)
(Continued)

(52) U.S. Cl.
CPC ............ *B41J 3/4073* (2013.01); *A45D 33/02* (2013.01); *A45D 34/04* (2013.01); *A45D 44/005* (2013.01); *G06K 9/00281* (2013.01)

(58) Field of Classification Search
None
See application file for complete search history.

(56) References Cited

U.S. PATENT DOCUMENTS

2003/0063794 A1* 4/2003 Rubinstenn .......... A45D 44/005
                                                      382/154
2003/0065255 A1* 4/2003 Giacchetti ............ A45D 44/005
                                                      600/407
(Continued)

FOREIGN PATENT DOCUMENTS

TW     201212852 A    4/2012
TW     201334732 A    9/2013
(Continued)

OTHER PUBLICATIONS

Byrdie, "Where to apply Blush for your Face Shape", Feb. 2014, Retrieved from the Internet: <URL: https://www.byrdie.com/where-to-apply-blush-for-your-face-shape-round-square-long-2014> (Year: 2014).*

(Continued)

*Primary Examiner* — Jiangeng Sun
(74) *Attorney, Agent, or Firm* — McClure, Qualey & Rodack, LLP

(57) ABSTRACT

An automatic facial makeup method includes receiving a makeup template, wherein the makeup template comprises a plurality of defined areas and a plurality of makeup instructions relating to application of at least one makeup to the plurality of defined areas, and wherein each of the plurality of defined areas is defined by a plurality of first feature points. A facial image comprising a facial block is received, wherein the facial block corresponds to a facial region depicted in the facial image. Makeup areas in the facial block are defined by mapping, for each of the plurality of defined areas, first feature points to second feature points in the facial block, wherein each second feature point has a same relative position on the facial block as a corresponding first feature point. A makeup component performs a makeup (Continued)

operation according to each makeup instruction on the makeup area corresponding to each makeup instruction.

19 Claims, 17 Drawing Sheets

(51) Int. Cl.
*B41J 3/407* (2006.01)
*A45D 33/02* (2006.01)
*A45D 34/04* (2006.01)

(56) References Cited

U.S. PATENT DOCUMENTS

| | | | |
|---|---|---|---|
| 2012/0067364 A1* | 3/2012 | Wong | A45D 44/005 132/200 |
| 2014/0158147 A1* | 6/2014 | Butcher | A45D 40/30 132/200 |
| 2014/0209114 A1* | 7/2014 | Johnson | A45D 37/00 132/200 |
| 2015/0254501 A1* | 9/2015 | Yamanashi | G06K 9/00268 348/78 |
| 2016/0015152 A1* | 1/2016 | Ajiki | A45D 44/005 132/200 |

FOREIGN PATENT DOCUMENTS

| | | |
|---|---|---|
| TW | 201422173 A | 6/2014 |
| TW | 201424624 A | 7/2014 |

OTHER PUBLICATIONS

Vogue ("Yes, there is a specific order to putting on your make-up. Here's what you should be doing", 2014, Retrieved from the Internet: <URL: www.vogue.com.au/beauty/vogue-loves/yes-there-is-a-specific-order-to-putting-on-your-makeup-heres-what-you-should-be-doing/image-gallery/6869cd6bcb8f1efd822967714ef4c033>.*

Christen, "Tutorial & Reference—Eye Diagram, Parts of the Eye, Basic Eye Makeup", <url: https://web.archive.org/web/20121105170630/https://www.temptalia.com/tutorial-reference-eye-diagram-parts-of-the-eye-basic-eye-makeup/ > (Year: 2012).*

* cited by examiner

AUTOMATIC FACIAL MAKEUP METHOD

CROSS-REFERENCE TO RELATED APPLICATION

This non-provisional application claims priority under 35 U.S.C. § 119(a) to Patent Application No. 105117476 filed in Taiwan, R.O.C. on Jun. 2, 2016, the entire contents of which are hereby incorporated by reference.

BACKGROUND

Technical Field

The present invention relates to an automatic coloring technology, and in particular, to an automatic facial makeup method.

Related Art

People naturally strive to achieve beauty. Therefore, manufacturers in the market launch various skin care products and cosmetics for consumers to purchase. However, one challenge is that a consumer needs to repeatedly practice makeup skills in order to achieve a desirable and suitable makeup effect. However, due to different degrees of proficiency among users in applying makeup and due to various categories of cosmetics, there is often a discrepancy between a makeup effect expected by the consumer and the actual makeup effect.

With the continuous evolution of information technologies, a user may currently practice applying makeup or simulate a makeup effect by using a cosmetic makeup simulation apparatus. However, a makeup effect presented by a simulation apparatus still relies on the user's makeup skills by requiring the user to manually apply cosmetics on a human face. In addition, the makeup result achieved through manually applying makeup is still many times not equivalent to the makeup effect presented the simulation apparatus.

Therefore, improved systems and methods for utilizing automatic control technologies for accurately applying a makeup effect to a user's face that involves a simulated makeup effect displayed on a screen are desired.

SUMMARY

In one embodiment, an automatic facial makeup method includes receiving a makeup template, wherein the makeup template comprises a plurality of defined areas and a plurality of makeup instructions relating to application of at least one makeup to the plurality of defined areas, and wherein each of the plurality of defined areas is defined by a plurality of first feature points. A facial image comprising a facial block is received, wherein the facial block corresponds to a facial region depicted in the facial image. Makeup areas in the facial block are defined by mapping, for each of the plurality of defined areas, first feature points to second feature points in the facial block, wherein each second feature point has a same relative position on the facial block as a corresponding first feature point. A makeup component performs a makeup operation according to each makeup instruction on the makeup area corresponding to each makeup instruction.

In conclusion, by utilizing the automatic facial makeup method according to the embodiments of the present invention, a corresponding makeup preparation is accurately applied to a user's face according to a makeup template displayed on a screen, so that a makeup effect completed by a makeup machine on the user's face is closer to a makeup effect represented by the makeup template.

BRIEF DESCRIPTION OF THE DRAWINGS

The present invention will become more fully understood from the detailed description given herein below and are for illustration purposes only. Thus, the description below is not intended to limit the present invention, wherein.

DETAILED DESCRIPTION

Figure 1:
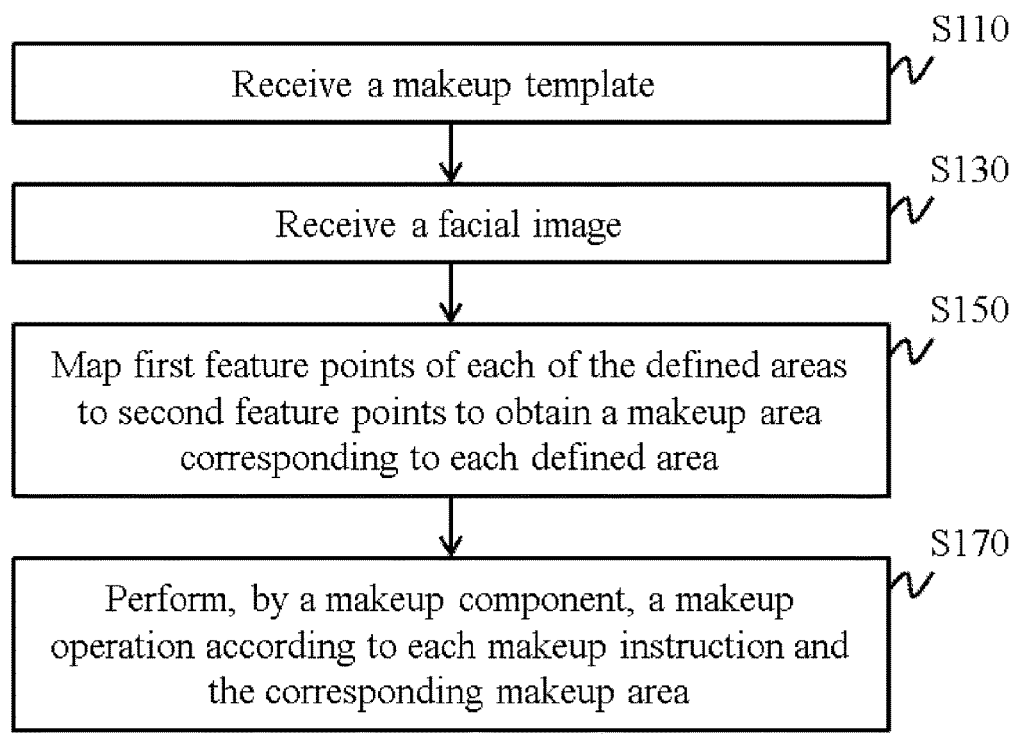
FIG. 1 is a flowchart of an automatic facial makeup method according to an embodiment of the present invention.
Figure 2:
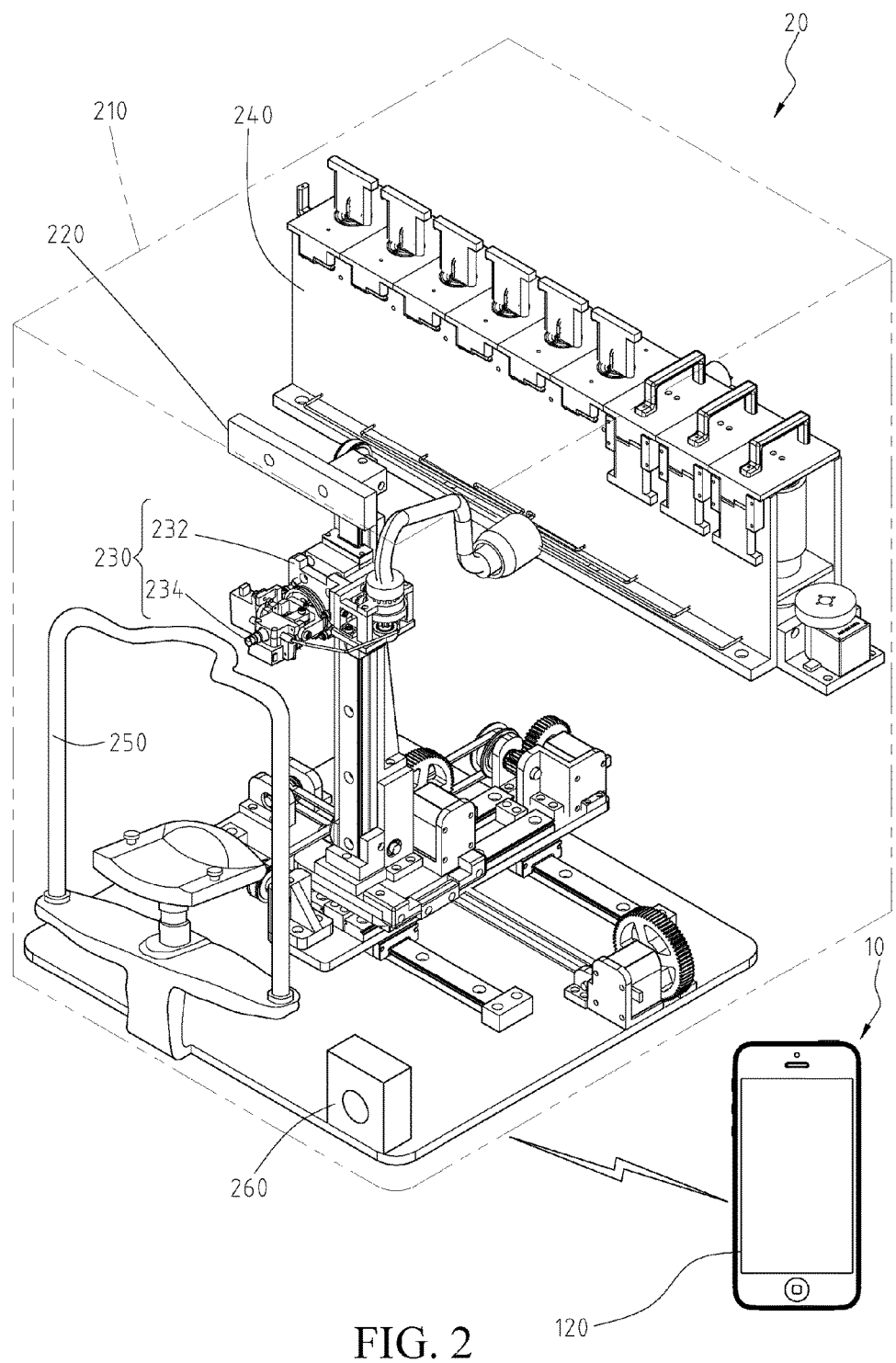
FIG. 2 is a schematic diagram of a makeup system according to an embodiment of the present invention.
Figure 3:
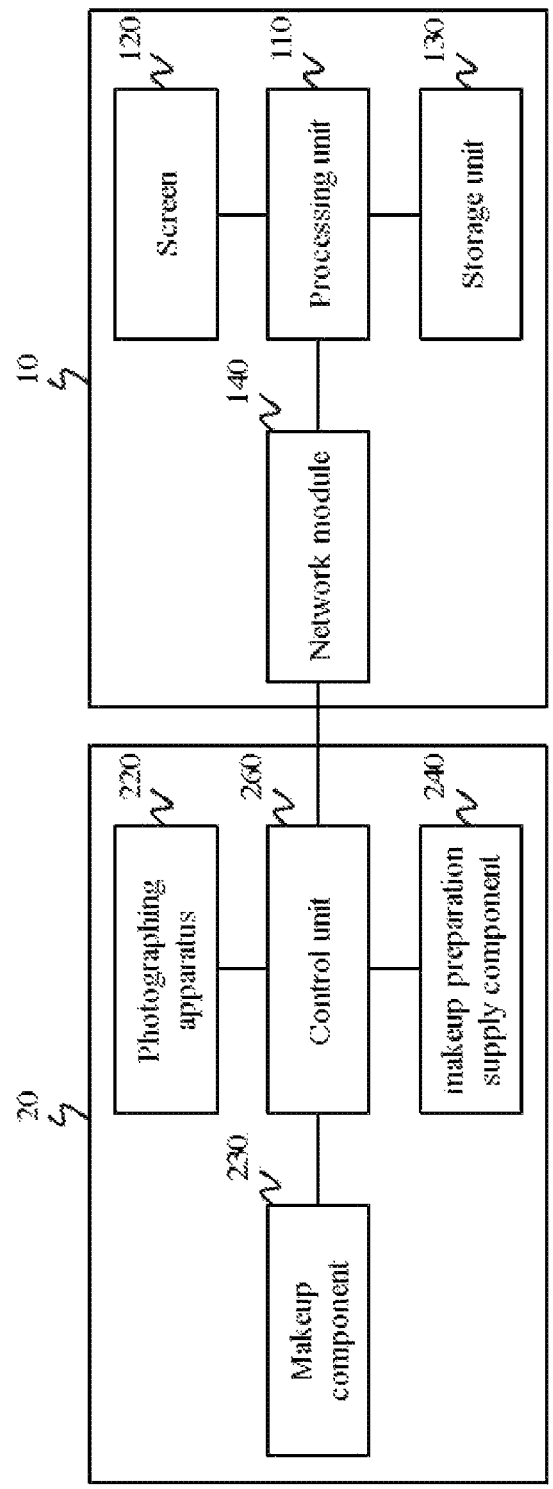
FIG. 3 is a functional block diagram of a makeup system according to an embodiment of the present invention.

FIG. 1 is a flowchart of an automatic facial makeup method according to an embodiment of the present invention. FIG. 2 is a schematic diagram of a makeup system according to an embodiment of the present invention. FIG. 3 is a functional block diagram of a makeup system according to an embodiment of the present invention. Referring to FIG. 1 to FIG. 3, the automatic facial makeup method is applicable to controlling a makeup system for applying cosmetics to a user. As shown in FIG. 2, the makeup system includes an electronic apparatus 10 and a makeup machine 20. The makeup machine 20 includes a housing 210, a photographing apparatus 220, a makeup component 230, a makeup preparation supply component 240, a facial positioning component 250, and a control unit 260. The photographing apparatus 220, the makeup component 230, the makeup preparation supply component 240, the facial positioning component 250, and the control unit 260 are located inside the housing 210 and are disposed on an inner wall of the housing 210. The makeup component 230 includes a moving module 232 and a nozzle 234, where the nozzle 234 is placed on the moving module 232. The nozzle 234 is located between the photographing apparatus 220 and the facial positioning component 250, and the nozzle 234 is connected to the makeup preparation supply component 240. The control unit 260 is connected to the photographing apparatus 220, the moving module 232, and the makeup preparation supply component 240.

Before a user undergoes the application of makeup, the user may select an effect of makeup to be done by using the electronic apparatus 10. That is, the user may select a makeup template using the electronic apparatus 10. In some embodiments, the storage unit 130 of the electronic apparatus 10 stores a makeup application program and at least one makeup template. A processing unit 110 of the electronic apparatus 10 can execute the makeup application program and is connected to the control unit 260 through execution of the makeup application program. In some embodiments, the processing unit 110 of the electronic apparatus 10 may communicate with the control unit 260 via a network (a wired network or a wireless network). In other words, the processing unit 110 is connected to a network via a network module 140, thereby allowing the processing unit 110 to communicate with the control unit 260. In some embodiments, the processing unit 110 of the electronic apparatus 10 may communicate with the control unit 260 via a signal transmission line. In such embodiments, the processing unit 110 is connected to one end of the signal transmission line via a connection module such as a USB port (not shown in the figure). The other end of the signal transmission line is connected to the control unit 260, so that the processing unit 110 communicates with the control unit 260.

Figure 4:
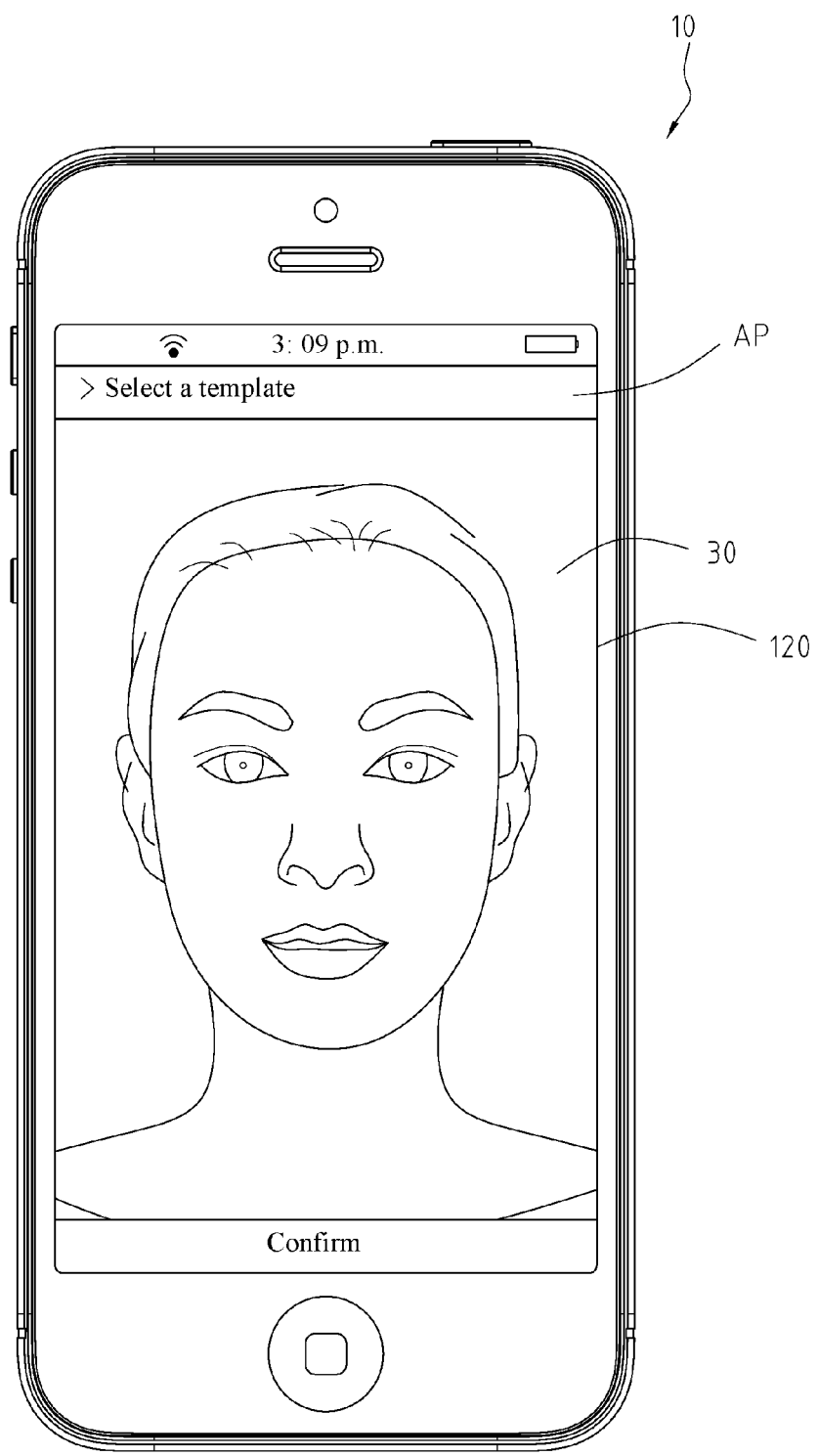
FIG. 4 is a schematic diagram of an example of an electronic apparatus of FIG. 2.

The processing unit 110 of the electronic apparatus 10 provides and displays at least one makeup template 30 on a screen 120 of the electronic apparatus 10 by executing a makeup application program (AP) (as shown in FIG. 4), for a user to select. After the user selects a makeup template 30 of the at least one makeup template, the processing unit 110 of the electronic apparatus 10 transmits the selected makeup template 30 to the control unit 260 by executing the makeup application program. The control unit 260 of the makeup machine 20 receives the makeup template 30 from the electronic apparatus 10 via a network (step S110).

Figure 5:
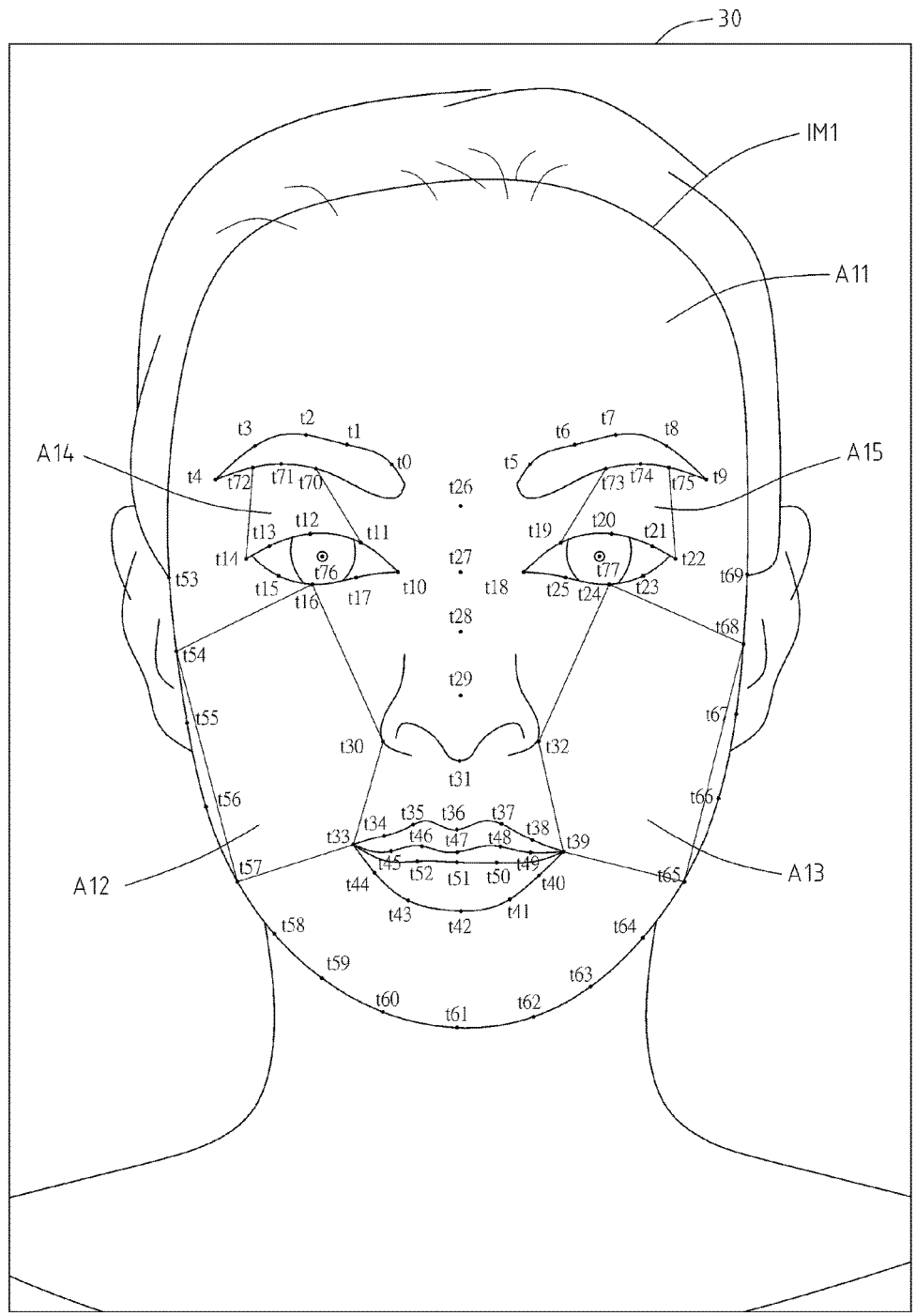
FIG. 5 is a schematic diagram of an example of a makeup template of FIG. 1.
Figure 6:
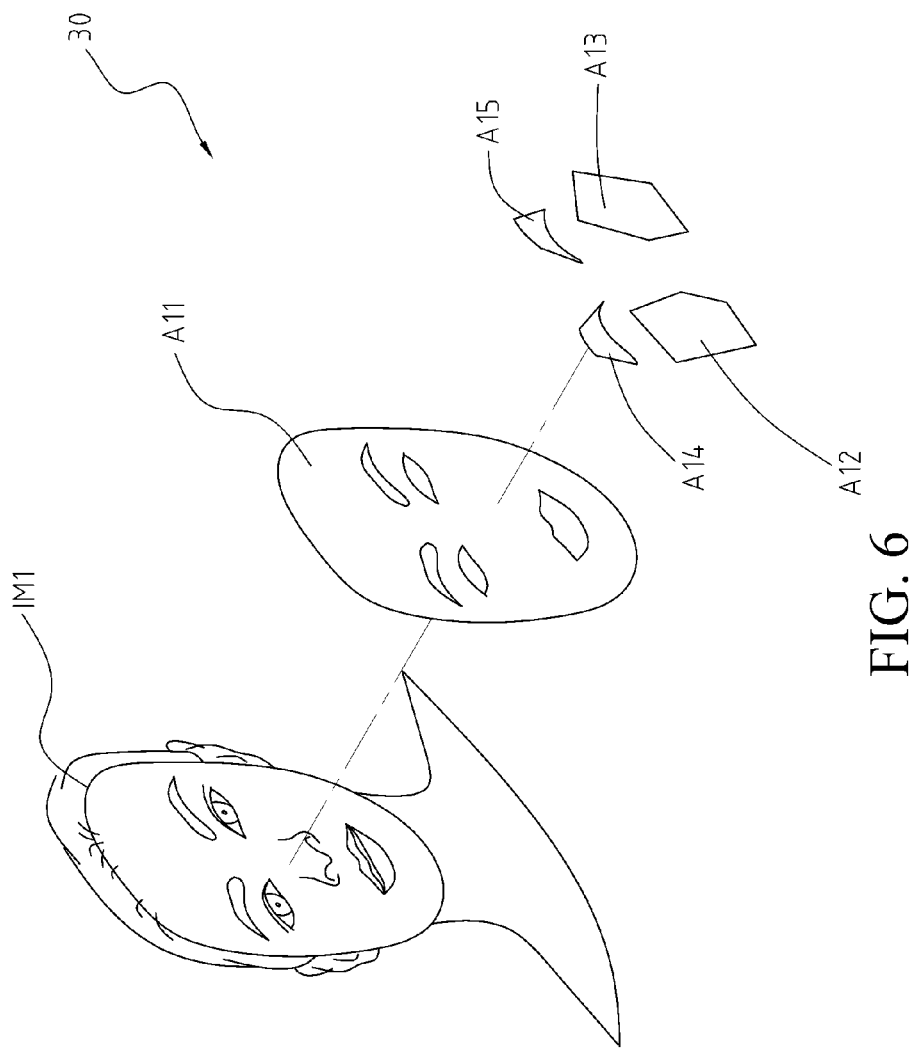
FIG. 6 is a schematic exploded view of a makeup template of FIG. 5.

Reference is made to FIGS. 4 to 6. In some embodiments, the makeup template 30 includes a plurality of defined areas A11, A12, A13, A14, and A15 and a plurality of makeup instructions of the defined areas A11, A12, A13, A14, and A15.

In some embodiments, each makeup instruction includes one or more pieces of color data (as shown in Table 1 below). Therefore, the control unit 260 controls, according to the color data, the makeup preparation supply component 240 to select one or more pigment container to provide a makeup preparation to the nozzle 234.

TABLE 1

| Defined area | Makeup instruction |
| --- | --- |
| A11 | Skin color |
| A12 and A13 | Pink |
| A14 and A15 | Purple |

In some embodiments, a makeup instruction may include single-color data such as, for example, purple. In some embodiments, a makeup instruction may include multiple-color data, such as, for example, purple and bright pink.

In some embodiments, other than color data, each makeup instruction may include aperture data of the nozzle 234. Therefore, the control unit 260 controls, according to the aperture data, the makeup component 230 (specifically, the driving unit of the moving module 232) to adjust an aperture of the nozzle 234.

In some embodiments, the defined areas A11, A12, A13, A14, and A15 are each defined by a plurality of feature points (referred to herein as first feature points t0 to t77 below).

For example, the defined area A11 may comprise a foundation defined area such as, for example, a spraying area composed of a facial outline that excludes the following avoided areas: an avoided area composed of the first feature points t0, t1, t2, t3, t4, t72, t71, and t70, an avoided area composed of the first feature points t5, t6, t7, t8, t9, t75, t74, and t73, an avoided area composed of the first feature points t10, t11, t12, t13, t14, t15, t16, and t17, an avoided area composed of the first feature points t18, t19, t20, t21, t22, t23, t24, and t25, and an avoided area composed of the first feature points t33, t34, t35, t36, t37, t38, t39, t40, t41, t42, t43, t44, t45, t46, t47, t48, and t49, whereby spraying is not performed on the avoided areas. The defined areas A12 and A13 are blush defined areas such as, for example, a spraying area composed of the first feature points t16, t30, t33, t57, and t54 and a spraying area composed of the first feature points t24, t32, t39, t65, and t68. The defined areas A14 and A15 are eye shadow defined areas such as, for example, a spraying area composed of the first feature points t11, t12, t13, t14, t72, t71, and t70 and a spraying area composed of the first feature points t19, t20, t21, t22, t75, t74, and t73.

In some embodiments, in addition to the defined areas A11, A12, A13, A14, and A15 and the corresponding makeup instructions, the makeup template 30 further includes a facial image IM1. The foundation defined area A11 is provided on a full-face skin area of the facial image IM1. The blush defined area A12 is provided on a right cheek area of the facial image IM1. The blush defined area A13 is provided on a left cheek area of the facial image IM1. The eye shadow defined area A14 is provided on a right eyelid area of the facial image IM1. The eye shadow defined area A15 is provided on a left eyelid area of the facial image IM1.

In some embodiments, different defined areas may be spaced in a manner that is closely adjacent to but not overlapping, or in a manner that is mutually overlapping (for example, completely overlapping or partially overlapping).

Figure 7:
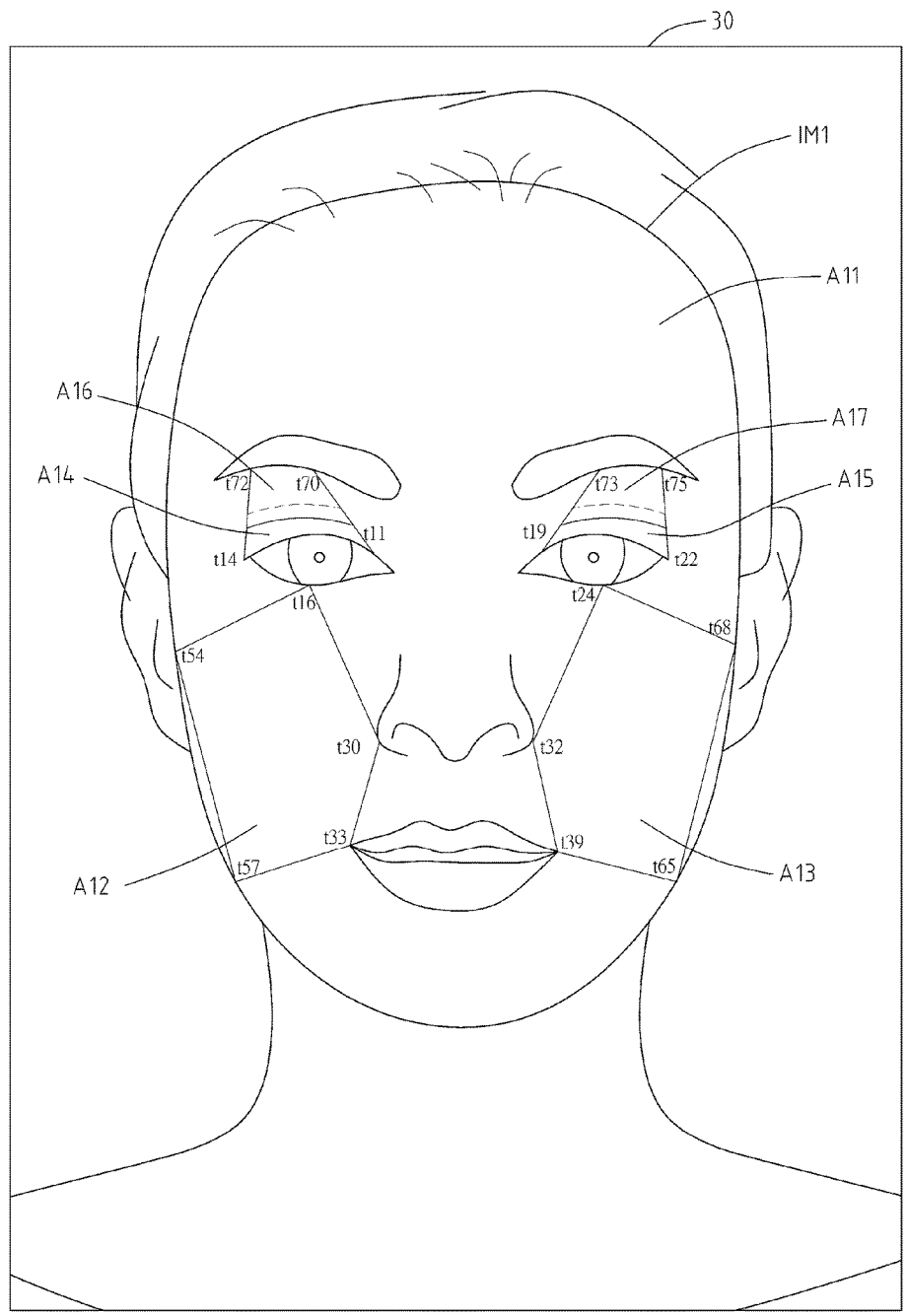
FIG. 7 is a schematic diagram of another example of the makeup template of FIG. 1.
Figure 8:
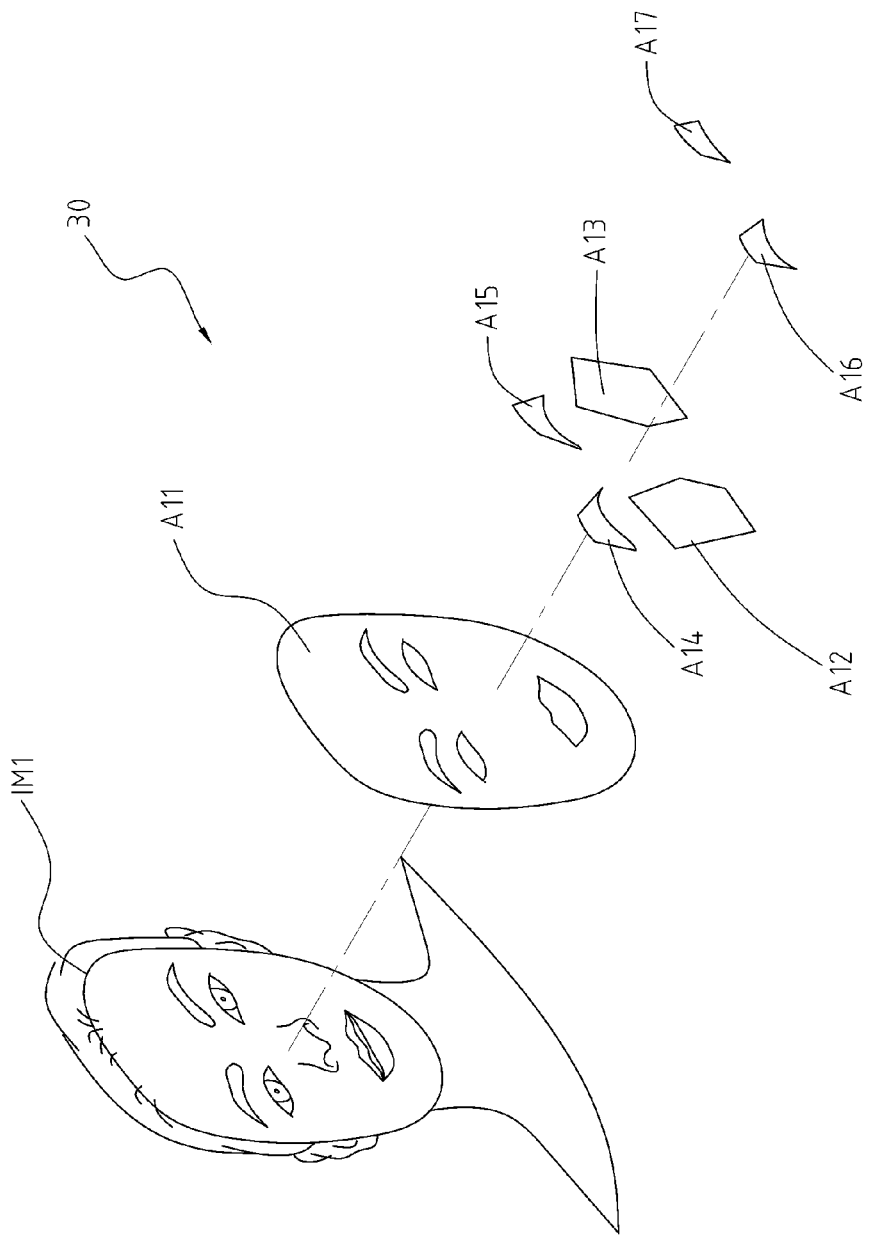
FIG. 8 is a schematic exploded view of a makeup template of FIG. 7.

For example, referring to FIG. 7 and FIG. 8, the eye shadow defined areas include first eye shadow defined areas A14 and A15 and second eye shadow defined areas A16 and A17. The first eye shadow defined area A14 and the second eye shadow defined area A16 are provided on the right eyelid area of the facial image IM1 in a partially overlapping manner. The first eye shadow defined area A15 and the second eye shadow defined area A17 are provided on the left eyelid area of the facial image IM1 in a partially overlapping manner.

In some embodiments, the defined areas may also be spraying areas of a specific ratio. For example, the first eye shadow defined area A14 is a lower two-thirds of a spraying area composed of the first feature points t11, t12, t13, t14, t72, t71, and t70, and the second eye shadow defined area A16 is an upper two-thirds of a spraying area composed of the first feature points t11, t12, t13, t14, t72, t71, and t70. The first eye shadow defined area A15 is a lower two-thirds of a spraying area composed of the first feature points t19, t20, t21, t22, t75, t74, and t73, and the second eye shadow defined area A17 is an upper two-thirds of a spraying area composed of the first feature points t19, t20, t21, t22, t75, t74, and t73.

Figure 9:
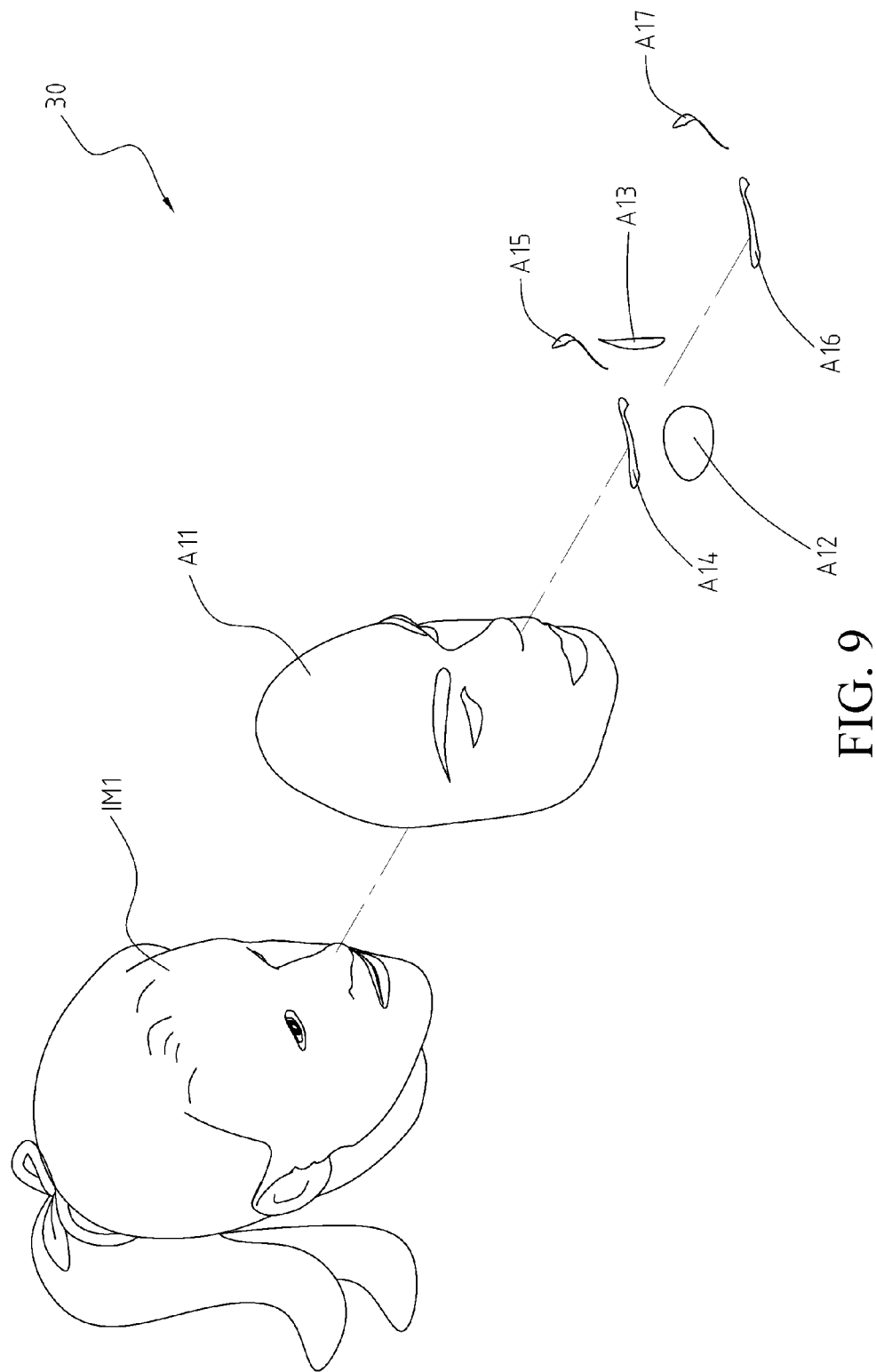
FIG. 9 is a schematic exploded view of still another example of the makeup template of FIG. 1.

In some embodiments, the makeup template 30 may be a 2D image, as shown in FIG. 5 to FIG. 8. In other embodiments, the makeup template 30 may be a three-dimensional (3D) image, as shown in FIG. 9.

Figure 10:
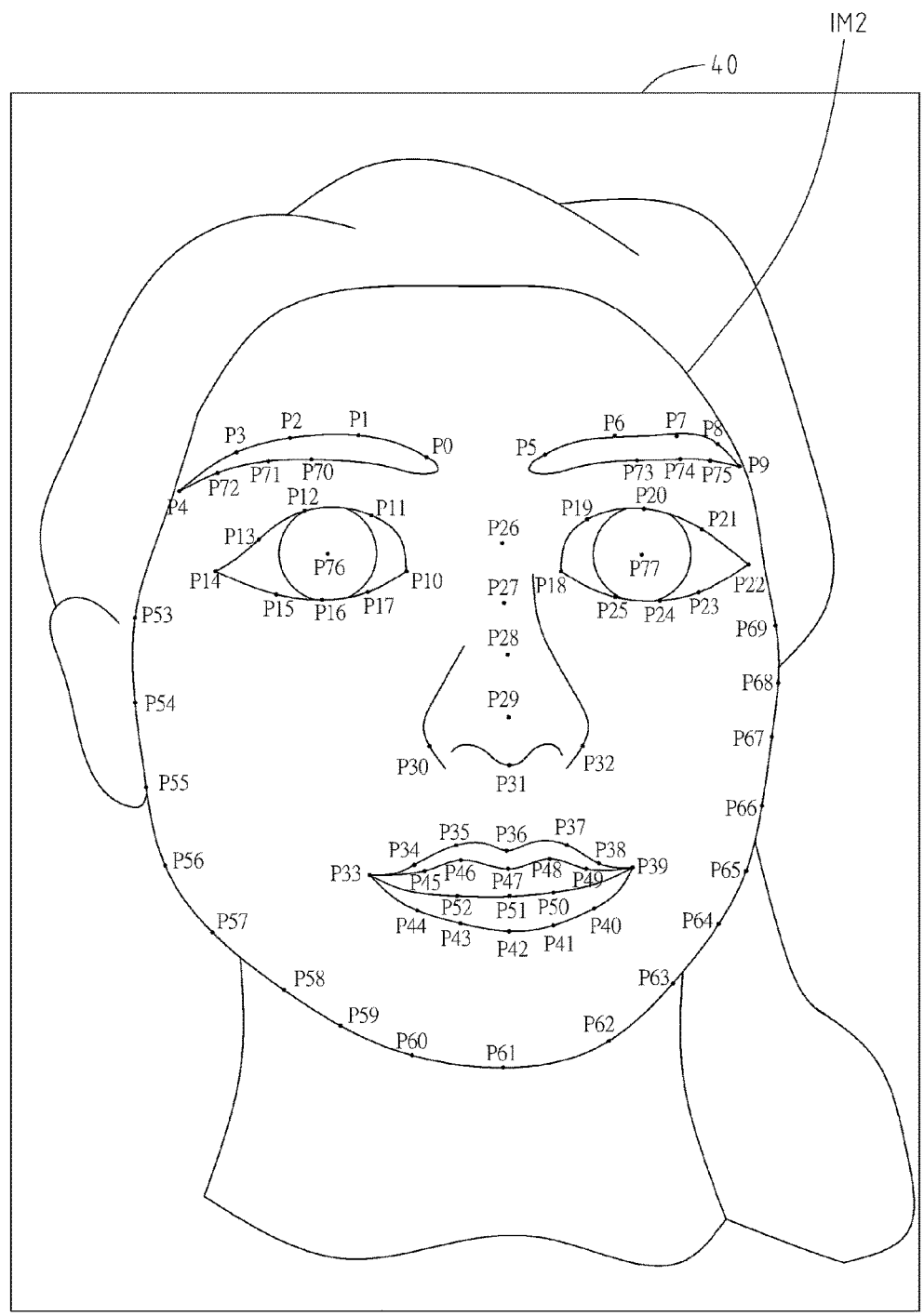
FIG. 10 is a schematic diagram of an example of a facial image of FIG. 1.

In addition, before a user undergoes the application of makeup, the user faces the photographing apparatus 220 of the makeup machine 20 (that is, a face of the user faces a camera of the photographing apparatus 220) and places at least a part of the user's head (for example, the user's jaw, forehead or other part of the head) on a facial positioning component 250 of the makeup machine 20. In other words, the facial positioning component 250 may be configured to fasten or hold the head of the user to provide a correct photographing location. After the head of the user is placed on the facial positioning component 250, the photographing apparatus 220 captures a facial image 40 of the face of the user. Then, the control unit 260 receives the facial image 40 from the photographing apparatus 220 (step S130), as shown in FIG. 10. However, the present invention is not limited to capturing the facial image 40 as the user is using the makeup machine 20. For example, the control unit 260 may receive the facial image 40 by reading a facial image 40 stored in a memory storage unit of the makeup machine 20, or the control unit 260 may receive the facial image 40 by downloading, by a wired or wireless network, a facial image 40 stored in a cloud storage unit. Alternatively, the control unit 260 may receive a facial image 40 (for example, a facial image 40 pre-stored in the storage unit 130 or a facial image 40 currently captured by the electronic apparatus 10) from the electronic apparatus 10 by means of wired or wireless connection.

In some embodiments, the facial image 40 may be a three-dimensional (3D) image, where the photographing apparatus 220 is a three-dimensional (3D) photographing apparatus.

In some embodiments, both the makeup template 30 and the facial image 40 may be three-dimensional (3D) images. In some other embodiments, both the makeup template 30 and the facial image 40 may be two-dimensional (2D) images. In yet other embodiments, one of the makeup template 30 or the facial image 40 may be a two-dimensional (2D) image, where the other one is a 3D image.

Reference is made to FIG. 10. In some embodiments, the facial image 40 includes a facial block IM2 and a plurality of feature points on the facial block IM2 (referred to as second feature points P0 to P77 below).

In some embodiments, the feature points may be 78. In some embodiments, the feature points 0, 1, 2, 3, 4, 72, 71, and 70 (that is, the first feature points t0, t1, t2, t3, t4, t72, t71, and t70 and the second feature points P0, P1, P2, P3, P4, P72, P71, and P70) are located on an edge of a right eyebrow image and sequentially surround the right eyebrow image. The feature points 5, 6, 7, 8, 9, 75, 74, and 73 (that is, the first feature points t5, t6, t7, t8, t9, t75, t74, and t73 and the second feature points P5, P6, P7, P8, P9, P75, P74, and P73) are located on an edge of a left eyebrow image and sequentially surround the left eyebrow image. The feature points 10, 11, 12, 13, 14, 15, 16, and 17 (that is, the first feature points t10, t11, t12, t13, t14, t15, t16, and t17 and the second feature points P10, P11, P12, P13, P14, P15, P16, and P17) are located on an edge of a right eye image and sequentially surround the right eye image. The feature point 10 (that is, the first feature point t10 and the second feature point P10) are located on an inner canthus of the right eye image, and the feature point 14 (that is, the first feature point t14 and the second feature point P14) is located on an outer canthus of the right eye image. The feature points 18, 19, 20, 21, 22, 23, 24, and 25 (that is, the first feature points t18, t19, t20, t21, t22, t23, t24, and t25 and the second feature points P18, P19, P20, P21, P22, P23, P24, and P25) are located on an edge of a left eye image and sequentially surround the left eye image. The feature point 18 (that is, the first feature point t18 and the second feature point P18) are located on an inner canthus of the left eye image, and the feature point 22 (that is, the first feature point t22 and the second feature point P22) is located on an outer canthus of the left eye image. The feature point 26, 27, 28, and 29 (that is, the first feature points t26, t27, t28, and t29 and the second feature points P26, P27, P28, and P29) are sequentially located on a nose bridge of a nose image from top to bottom. The feature point 26 (that is, the first feature point t26 and the second feature point P26) is located on the nose image at a middle location between the two eyes, and the feature point 29 (that is, the first feature point t29 and the second feature point P29) is located on a nose tip of the nose image. The feature point 30 (that is, the first feature point t30 and the second feature point P30) is located on a right nose wing of the nose image. The feature point 31 (that is, the first feature point t31 and the second feature point P31) is located below a nose of the nose image. The feature point 32 (that is, the first feature point t32 and the second feature point P32) is located on a left nose wing of the nose image. The feature point 33 (that is, the first feature point t33 and the second feature point P33) is located on a right mouth corner of a mouth image. The feature points 34, 35, 36, 37, and 38 (that is, the first feature points t34, t35, t36, t37, and t38 and the second feature points P34, P35, P36, P37, and P38) are sequentially located on an upper mouth edge of the mouth image from right to left. The feature point 36 (that is, the first feature point t36 and the second feature point P36) is located on an upper mouth edge at a lip mark location of the mouth image. The feature point 35 (that is, the first feature point t35 and the second feature point P35) is located on a right lip peak edge of the mouth image, and the feature point 37 (that is, the first feature point t37 and the second feature point P37) is located on a left lip peak edge of the mouth image. The feature points 40, 41, 42, 43, and 44 (that is, the first feature points t40, t41, t42, t43, and t44 and the second feature points P40, P41, P42, P43, and P44) are sequentially located on a lower mouth edge of the mouth image from left to right. The feature points 45, 46, 47, 48, and 49 (that is, the first feature points t45, t46, t47, t48, and t49 and the second feature points P45, P46, P47, P48, and P49) are sequentially located on an upper rictus edge of the mouth image from right to left. The feature points 50, 51, and 52 (that is, the first feature points t50, t51, and t52 and the second feature points P50, P51, and P52) are sequentially located on a lower rictus edge of the mouth image from left to right. The feature points 53, 54, 55, 56, 57, 58, 59, 60, 61, 62, 63, 64, 65, 66, 67, 68, and 69 (that is, the first feature points t53, t54, t55, t56, t57, t58, t59, t60, t61, t62, t63, t64, t65, t66, t67, t68, and t69 and the second feature points P53, P54, P55, P56, P57, P58, P59, P60, P61, P62, P63, P64, P65, P66, P67, P68, and P69) are located on an edge of the facial image. The feature point 53 (that is, the first feature point t53 and the second feature point P53) is located on a junction of an upper edge of a right ear image and an edge of the facial image, and the feature point 55 (that is, the first feature point t55 and the second feature point P55) is located on a junction of a lower edge of the right ear image and the edge of the facial image. The feature point 61 (that is, the first feature point t61 and the second feature point P61) is located at the middle of a jaw of the edge of the facial image. The feature point 69 (that is, the first feature point t69 and the second feature point P69) is located on a junction of an upper edge of a left ear image and the edge of the facial image, and the feature point 67 (that is, the first feature point t67 and the second feature point P67) is located at a junction of a lower edge of the left ear image and the edge of the facial image. The feature point 76 (that is, the first feature point t76 and the second feature point P76) is located in the middle of an eyeball of the right eye image, and the feature point 77 (that is, the first feature point t77 and the second feature point P77) is located in the middle of an eyeball of the left eye image.

Then, the control unit 260 maps each of the first feature points of the defined areas A11, A12, A13, A14, A15, A16, and A17 to corresponding second feature points (e.g., at least a part of the second feature points having the same relative position as the first feature points of the defined areas A11) on a facial block IM2, to generate makeup areas corresponding to the defined areas A11, A12, A13, A14, A15, A16, and A17 (step S150). That is, in some embodiments, the control unit 260 may map each of the first feature points of the defined areas A11, A12, A13, A14, A15, A16, and A17 to only a part of or all of the second feature points having the same relative position as the first feature points of the defined areas A11.

Figure 11:
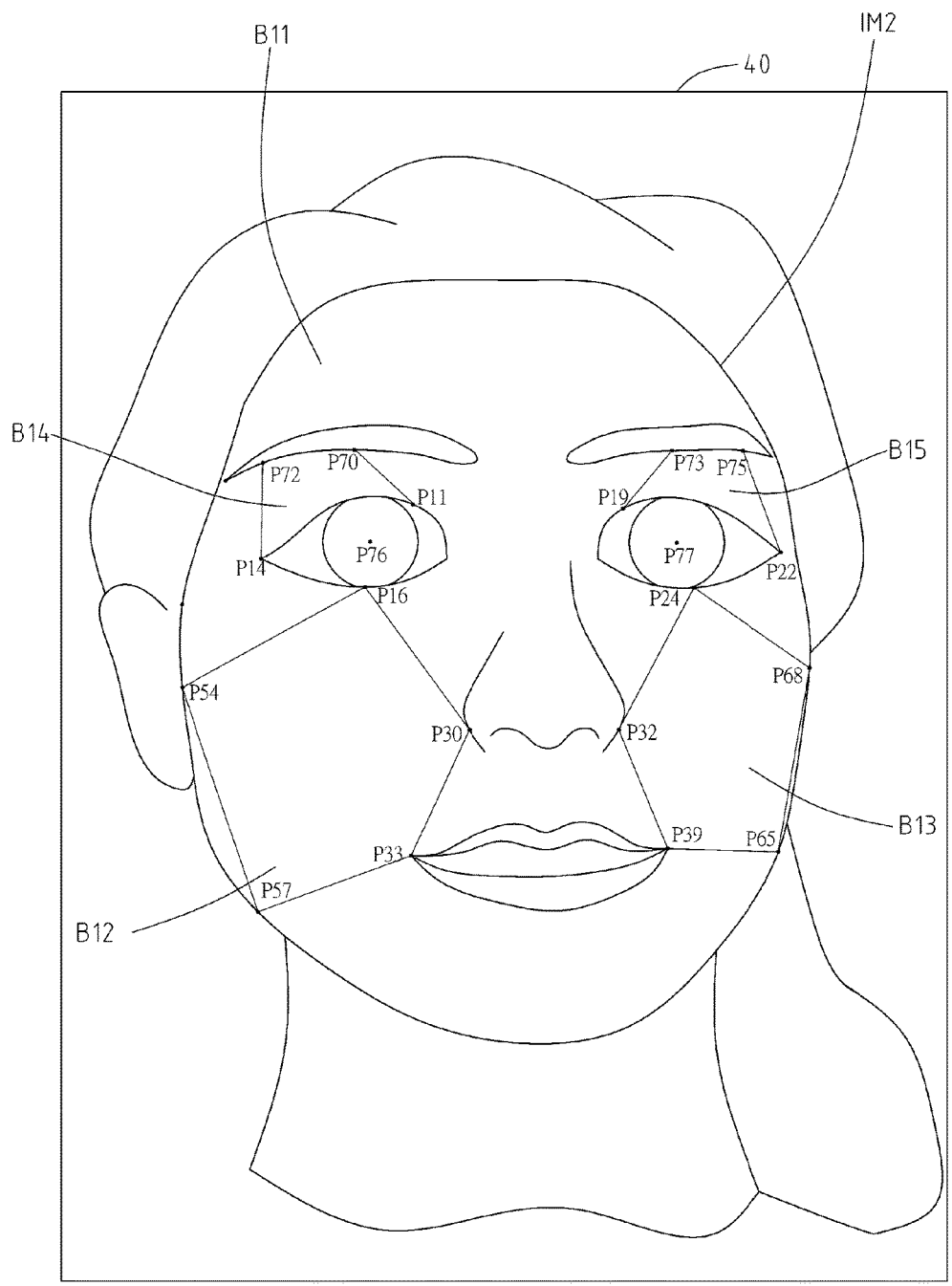
FIG. 11 is a schematic diagram of an example of a mapped facial image of FIG. 1.

For example, using the makeup template 30 shown in FIG. 5, the control unit 260 maps a facial outline of the foundation defined area (A11) and the first feature points t0, t1, t2, t3, t4, t72, t71, t70, t5, t6, t7, t8, t9, t75, t74, t73, t10, t11, t12, t13, t14, t15, t16, t17, t18, t19, t20, t21, t22, t23, t24, t25, t33, t34, t35, t36, t37, t38, t39, t40, t41, t42, t43, t44, t45, t46, t47, t48, and t49 to a facial outline of the facial block IM2 and same second feature points P0, P1, P2, P3, P4, P72, P71, P70, P5, P6, P7, P8, P9, P75, P74, P73, P10, P11, P12, P13, P14, P15, P16, P17, P18, P19, P20, P21, P22, P23, P24, P25, P33, P34, P35, P36, P37, P38, P39, P40, P41, P42, P43, P44, P45, P46, P47, P48, and P49, to generate a foundation makeup area B11 corresponding to the defined area A11, as shown in FIG. 11. In other words, the foundation makeup area B11 is a spraying area composed of facial outlines, that exclude: an avoided area composed of the first feature points P0, P1, P2, P3, P4, P72, P71, and P70, an avoided area composed of the first feature points P5, P6, P7, P8, P9, P75, P74, and P73, an avoided area composed of the first feature points P10, P11, P12, P13, P14, P15, P16, and P17, an avoided area composed of the first feature points P18, P19, P20, P21, P22, P23, P24, and P25, and an avoided area composed of the first feature points P33, P34, P35, P36, P37, P38, P39, P40, P41, P42, P43, P44, P45, P46, P47, P48, and P49, whereby spraying is not performed on the avoided areas.

The control unit 260 maps the first feature points t16, t30, t33, t57, and t54 of the blush defined area (A12) to corresponding second feature points P16, P30, P33, P57, and P54 of the facial block IM2, to generate a blush makeup area B12 corresponding to the defined area A12, as shown in FIG. 11. The control unit 260 maps the first feature points t24, t32, t39, t65, and t68 of the blush defined area (A13) to same second feature points P24, P32, P39, P65, and P68 of the facial block IM2, to generate a blush makeup area B13 corresponding to the defined area A13, as shown in FIG. 11.

The control unit 260 maps the first feature points t11, t12, t13, t14, t72, t71, and t70 of the eye shadow defined area (A14) to corresponding second feature points P11, P12, P13, P14, P72, P71, and P70 of the facial block IM2, to generate an eye shadow makeup area B14 corresponding to the defined area A14, as shown in FIG. 11. The control unit 260 maps the first feature points t19, t20, t21, t22, t75, t74, and t73 of the eye shadow defined area (A15) to same second feature points P19, P20, P21, P22, P75, P74, and P73 of the facial block IM2, to generate an eye shadow makeup area B15 corresponding to the defined area A15, as shown in FIG. 11.

In some embodiments, each makeup area may comprise polygonal coordinate data defined by the multiple second feature points.

Eventually, the control unit 260 controls, according to the makeup instructions and the corresponding makeup areas B11, B12, B13, B14, and B15, the makeup component 230 to perform a makeup operation (step S170).

In some embodiments, the makeup instructions in the makeup template 30 define a specific sequence for applying makeup. Therefore, the control unit 260 may sequentially perform a makeup operation on the user's face according to the makeup instructions and the corresponding makeup areas B11, B12, B13, B14, and B15. The makeup instructions may define, for example, a makeup operation performed on makeup areas to which the corresponding defined areas are mapped, a makeup preparation to be applied, an aperture of the nozzle 234 to be used, or a combination thereof.

In some embodiments, the makeup template 30 defines a specific sequence for executing the makeup instructions. For example, the execution sequence may be as follows: the makeup instruction of the defined area A11→the makeup instruction of the defined area A12→the makeup instruction of the defined area A13→the makeup instruction of the defined area A14→the makeup instruction of the defined area A15. Therefore, the control unit 260 performs the makeup operation in the following sequence: the makeup instruction of the makeup area B11→the makeup instruction of the makeup area B12→the makeup instruction of the makeup area B13→the makeup instruction of the makeup area B14→the makeup instruction of the makeup area B15.

Figure 12:
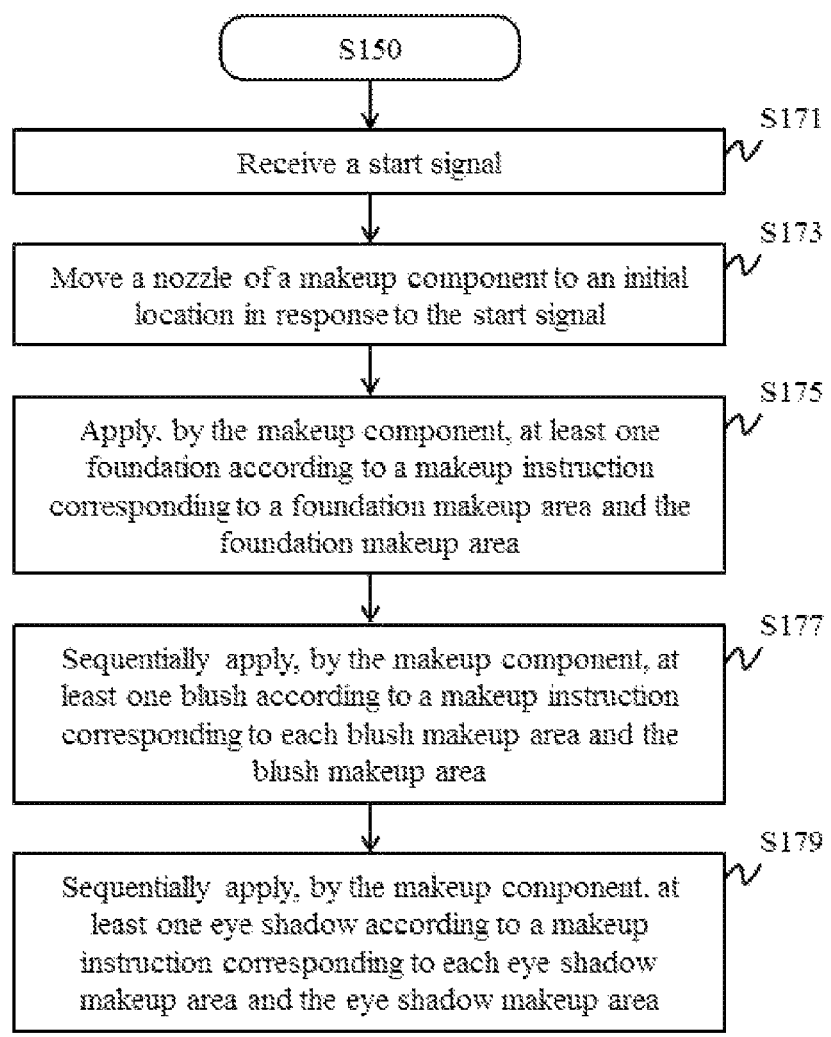
FIG. 12 is a detailed flowchart of an example of step S170 of FIG. 1.

Reference is made to FIG. 12. In some embodiments, the control unit 260 controls, according to the makeup instruction corresponding to the foundation makeup area and the foundation makeup area, the makeup component 230 to apply at least one foundation (a makeup preparation) (step S175). After the step of applying the foundation is completed, the control unit 260 controls, according to the makeup instruction corresponding to each blush makeup area and the blush makeup area, the makeup component 230 to apply at least one blush effect (a makeup preparation) (step S177). After the step of applying the blush is completed, the control unit 260 sequentially controls, according to the makeup instruction corresponding to each eye shadow makeup area and the eye shadow makeup area, the makeup component 230 to apply at least one eye shadow (a makeup preparation) (step S179).

To illustrate, the makeup template 30 shown in FIG. 5 and Table 1 is used as an example. The control unit 260 controls, according to the makeup instruction (e.g., skin color) of the foundation defined area A11, the makeup preparation supply component 240 to select one or more pigment containers to provide a skin-color foundation (e.g., a skin-color makeup preparation) to the nozzle 234. Then, the control unit 260 controls, according to the foundation makeup area B11, the moving module 232 to move the nozzle 234 to a spraying start point, and controls, according to the foundation makeup area B11, the moving module 232 to move the nozzle 234 on a spraying track corresponding to the foundation makeup area B11 and simultaneously controls the nozzle 234 to eject the skin-color foundation, so as to apply the foundation to the entire facial skin area of the user.

The control unit 260 controls, according to the makeup instruction (e.g., pink) of the blush defined area A12, the makeup preparation supply component 240 to select one or more pigment containers to provide a pink blush (e.g., a pink makeup preparation) to the nozzle 234. Then, the control unit 260 controls, according to the blush makeup area B12, the moving module 232 to move the nozzle 234 to the spraying start point, and controls, according to the blush makeup area B12, the moving module 232 to move the nozzle 234 on a spraying track corresponding to the blush makeup area B12 and simultaneously controls the nozzle 234 to eject the pink blush, so as to apply the blush to a right cheek of the user. Similarly, the control unit 260 then controls, according to the makeup instruction of the blush defined area A13 and the blush makeup area B13, the makeup component 230 to apply the pink blush on a left cheek of the user.

Then, the control unit 260 then controls, according to the makeup instruction (e.g., purple) of the eye shadow defined area A14, the makeup preparation supply component 240 to select one or more pigment containers to provide a purple eye shadow (e.g., a purple makeup preparation) to the nozzle 234. Then, the control unit 260 controls, according to the eye shadow makeup area B14, the moving module 232 to move the nozzle 234 to the spraying start point, and controls, according to the eye shadow makeup area B14, the moving module 232 to move the nozzle 234 on a spraying track corresponding to the eye shadow makeup area B14 and simultaneously controls the nozzle 234 to eject the purple eye shadow, so as to apply the eye shadow to a right eyelid of the user. Similarly, the control unit 260 then controls, according to the makeup instruction of the eye shadow defined area A15 and the eye shadow makeup area B15, the makeup component 230 to apply the purple eye shadow to a left eyelid of the user.

In some embodiments, the makeup instructions further include spraying paths of parts. Facial three-dimensional information needed by the spraying paths includes: three-dimensional (3D) grid information of a facial surface and facial 3D marking point information. The three-dimensional (3D) grid information of the facial surface is used when a foundation spraying path is generated, and a facial three-dimensional (3D) marking point is used when the foundation spraying path is generated, avoiding an eyebrow part, an eye part, and a mouth (e.g., lip) part, and when a blush spraying path and an eye shadow spraying path are generated. Application of the foundation is uniformly spraying of the foundation on a whole facial area but needs to avoid the eyebrow region, the eye region, and the mouth (e.g., lip) region. Therefore, referring to FIG. 13, the foundation spraying path divides the foundation makeup area B11 into a plurality of makeup areas B111 to B115, and the makeup areas B111 to B115 are respectively a left cheek makeup area B111, a jaw makeup area B112, a right cheek makeup area B113, a forehead makeup area B114, and a nose makeup area B115. These makeup areas B111 to B115 are constructed by dividing a whole facial three-dimensional (3D) grid, and the divided data is defined by using three-dimensional (3D) facial reference points.

Figure 13:
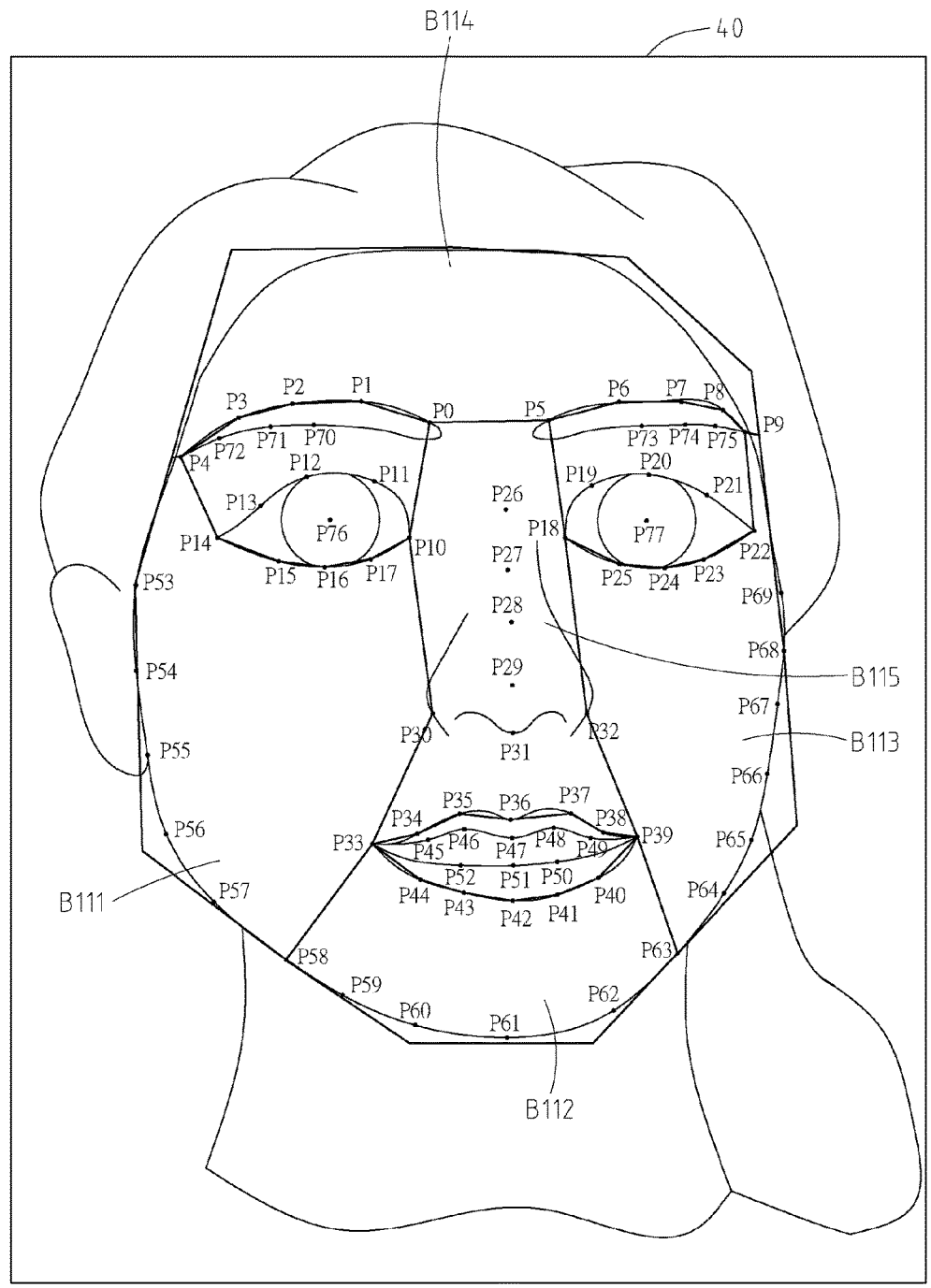
FIG. 13 is a schematic diagram of an example of a foundation makeup area.

Reference is made to FIG. 13. In some embodiments, the left cheek makeup area B111 is cut and separated through the use of grids with reference to the second feature points P14, P15, P16, P17, and P10 below a left eye, the second feature point P30 of the left nose wing, and the second feature point P33 of the left mouth corner. The jaw makeup area B112 is cut and separated through the use of grids with reference to the second feature points P33, P44, P43, P42, P41, and P40 of a lower lip line, the second feature point P33 of the left mouth corner, and the second feature point P39 of the right mouth corner. The right cheek makeup area B113 is cut and separated through the use of grids with reference to the second feature points P18, P25, P24, P23, and P22 below a right eye, the second feature point P32 of the right nose wing, and the second feature point P39 of the right mouth corner. The forehead makeup area B114 is cut and separated through the use of grids with reference to the second feature points P4, P3, P2, P1, and P0 on a left eyebrow and the second feature points P5, P6, P7, P8, and P9 on a right eyebrow. The nose makeup area B115 is cut and separated through the use of grids with reference to the second feature point P0 of an inner left eyebrow corner, the second feature point P5 of an inner right eyebrow corner, the second feature point P10 of an inner left canthus, and the second feature point P18 of an inner right canthus, the second feature point P30 of the left nose wing, the second feature point P32 of the right nose wing, and the second feature points P33, P34, P35, P36, P37, P38, and P39 on a lip. After the cutting operation is performed, the facial parts are covered with the exception of the eyebrow region, the eye region, and the mouth region.

Figure 14:
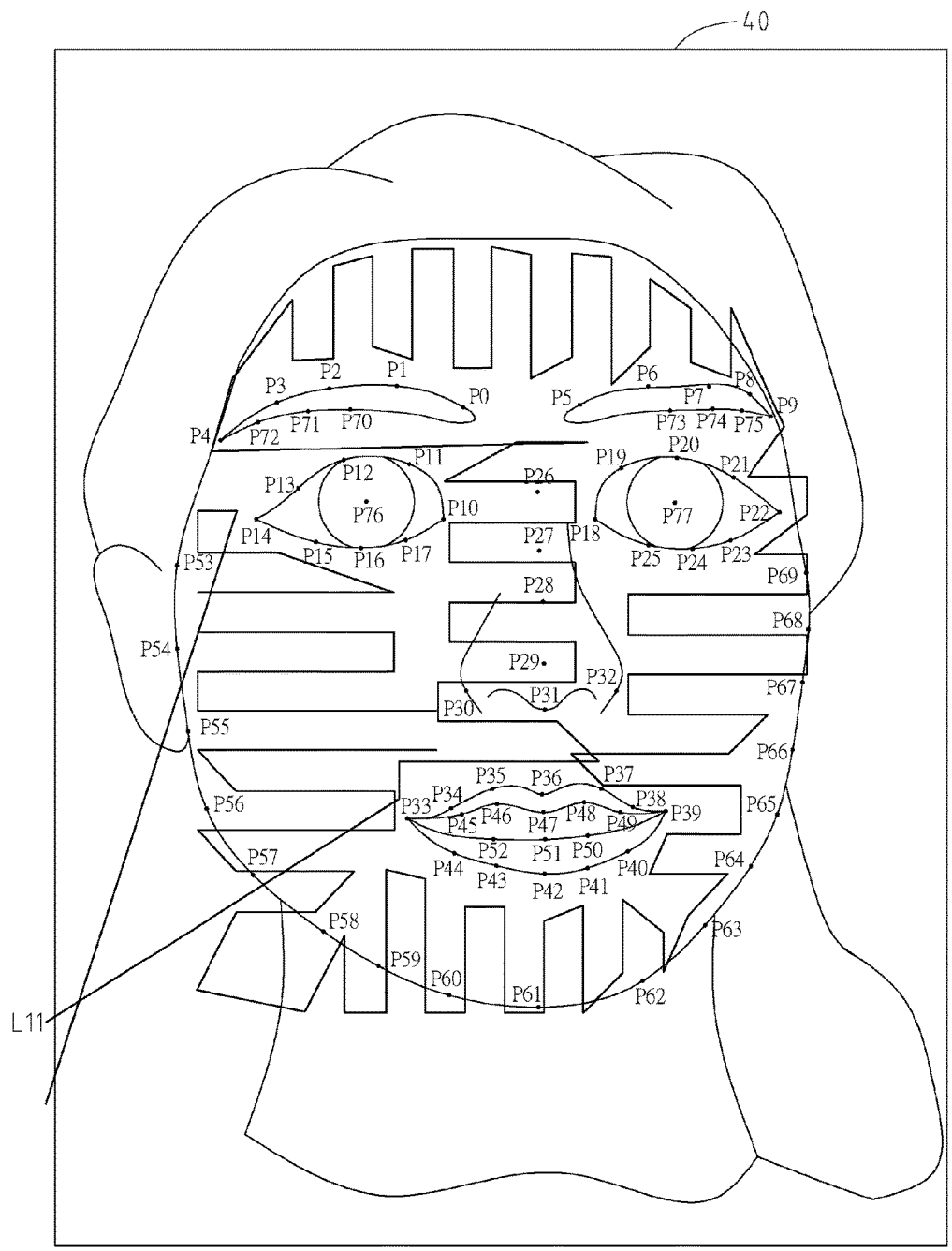
FIG. 14 is a schematic diagram of an example of a foundation spraying path of a foundation makeup area.

A foundation spraying path L11 is generated on the cut grid makeup areas B111 to B115 according to spraying intervals. Taking into consideration the smoothness of the foundation spraying path L11 and for purposes of saving spraying time, in the left cheek makeup area B111, the right cheek makeup area B113, and the nose makeup area B115, spraying paths of the three makeup areas B111, B113, B115 are generated in a manner that involves moving left and right in a staggered manner and moving evenly up and down at intervals. To accurately avoid the mouth part and the eyebrow part, in the jaw makeup area B112 and the forehead makeup area B114, spraying paths of the two makeup areas B112, B114 are generated in a manner of moving up and down in a staggered manner and moving evenly left and right at intervals. The generated foundation spraying path L11 is shown in FIG. 14.

Therefore, the foundation spraying path L11 may be a single path that involves sequentially passing the left cheek makeup area B111, the jaw makeup area B112, the right cheek makeup area B113, the forehead makeup area B114, and the nose makeup area B115.

Figure 15:
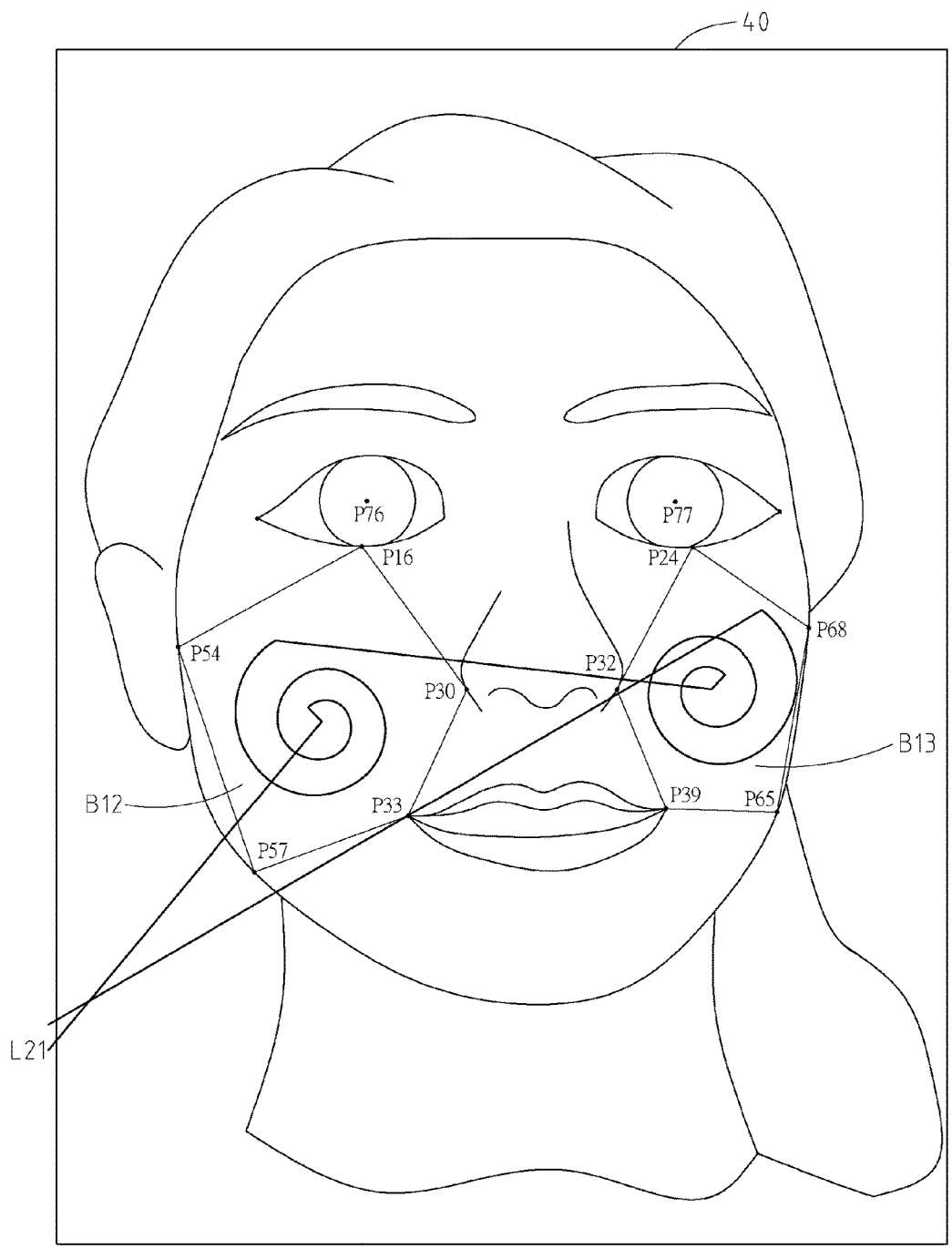
FIG. 15 is a schematic diagram of an example of a blush spraying path of a blush makeup area.

The blush spraying path defines a central point location of a blush-applying region by taking the second feature point P30 of the left nose wing, the second feature point P32 of the right nose wing, and the second feature points P76 and P77 of eye pupils into consideration. However, due to asymmetry of face placement, a nose bridge middle line may be established from a middle point between the second feature point P30 of the left nose wing and the second feature point P32 of the right nose wing to the second feature points P26, P27, P28, and P29 of a nose root, and a horizontal reference line is constructed by using the nose tip as an original point. Moreover, a central point location of a blush-applying region, a horizontal displacement distance of the blush-applying region, and a size of the blush-applying region may be defined according to the nose bridge middle line, the horizontal reference line, and a width between the two second feature points P76 and P77 of the two eye pupils. Then the blush spraying path L21 is constructed inside out in a spiral manner, to form two spiral-shaped spraying paths on the blush makeup areas B12 and B13 on both sides, as shown in FIG. 15. In some embodiments, the blush spraying path L21 may be a single path of passing the blush makeup areas B12 and B13 on both sides.

Figure 16:
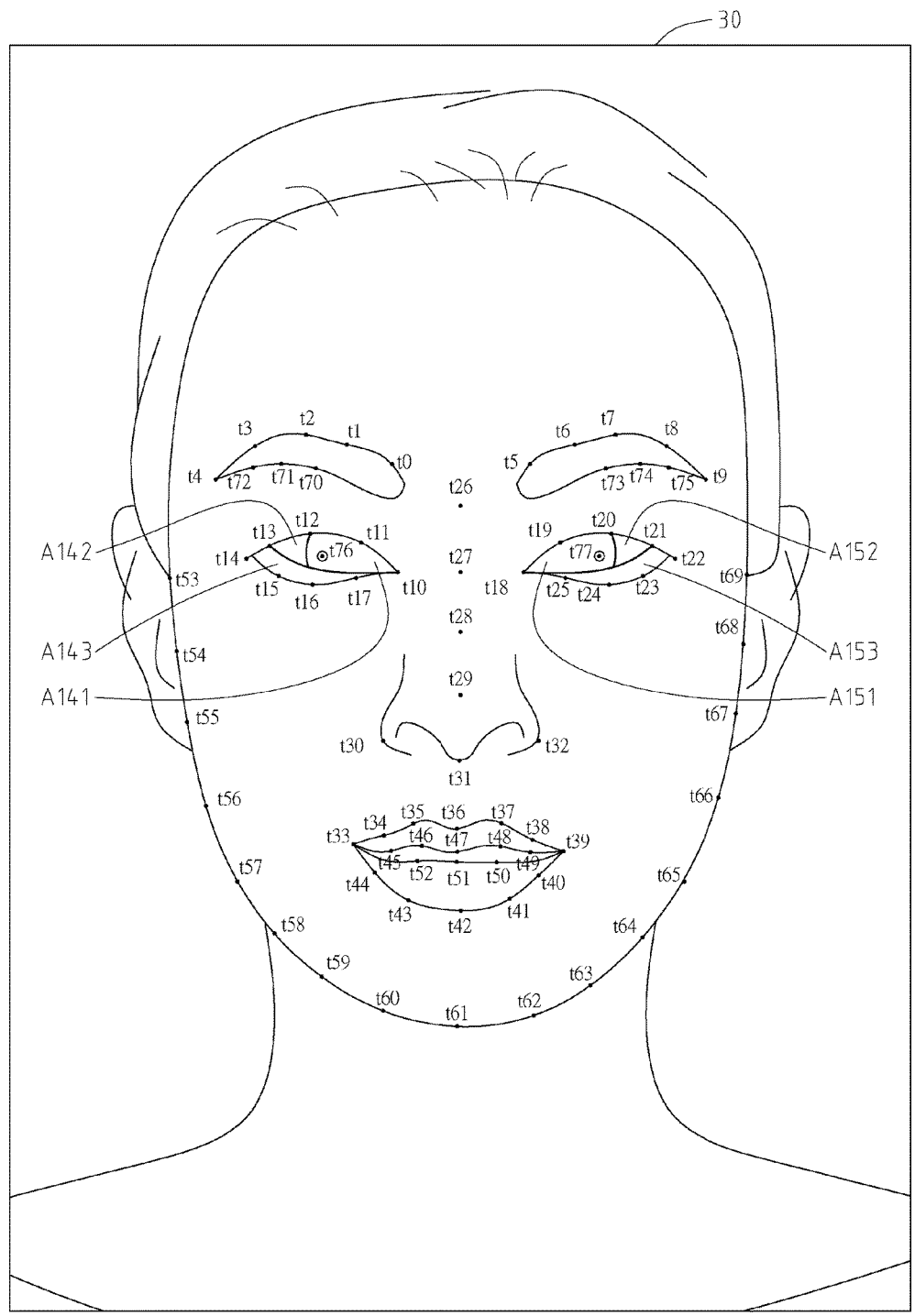
FIG. 16 is a schematic diagram of an example of an eye shadow defined area.
Figure 17:
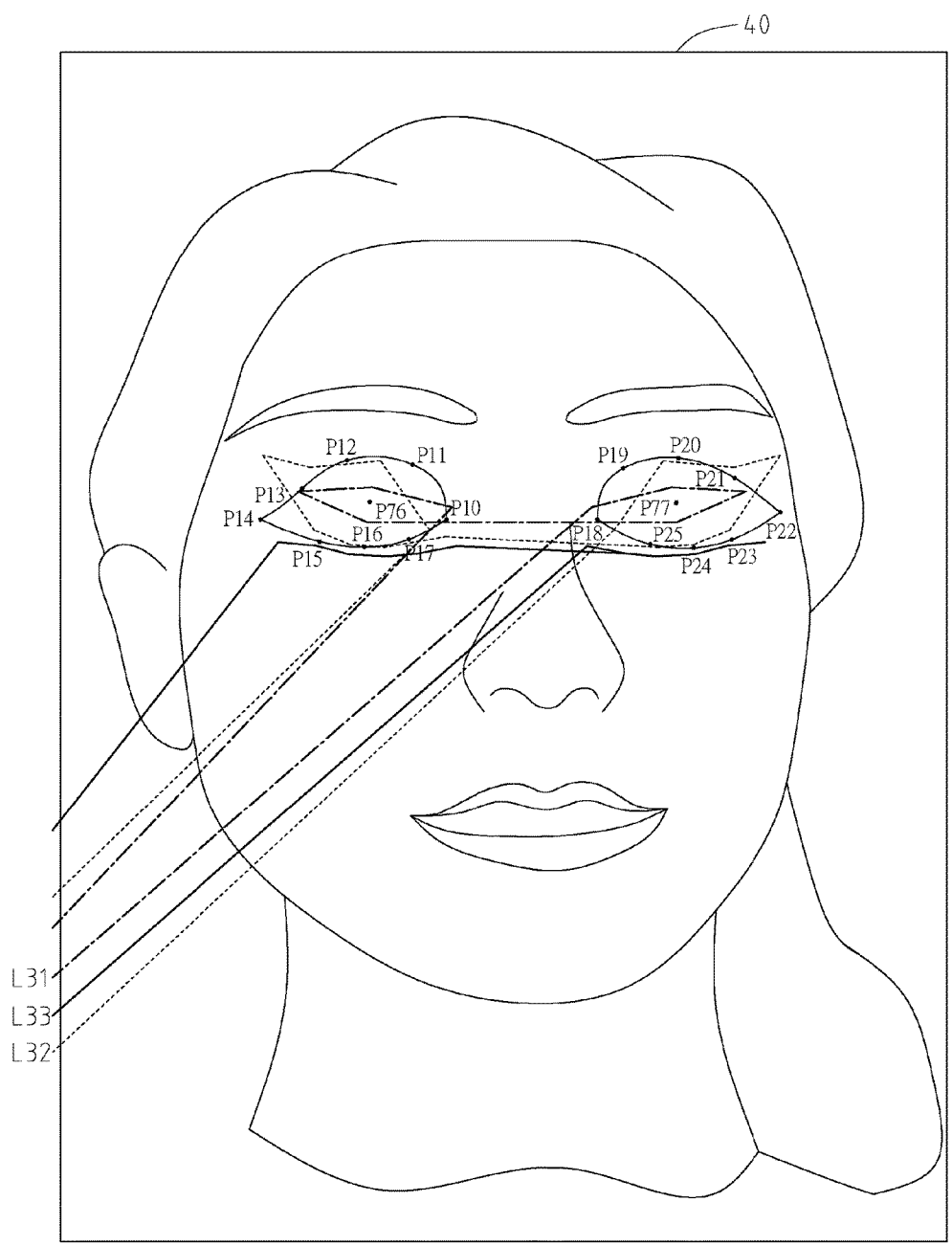
FIG. 17 is a schematic diagram of an example of an eye shadow spraying path of an eye shadow makeup area.

Reference is made to FIG. 16. In another embodiment, the eye shadow defined area A14 may be established with reference to the first feature points t10, t11, t12, t13, t14, t15, t16, and t17 of the eye edges. The eye shadow defined area A14 is divided into three defined sub-areas (referred to herein as a first defined sub-area A141, a second defined sub-area A142, and a third defined sub-area A143 below). Eye shadow spraying paths L31, L32, and L33 are extended and constructed according to that the first feature points t10, t11, t12, t13, t14, t15, t16, and t17 correspond to the second reference points P10, P11, P12, P13, P14, P15, P16, and P17. In some embodiments, the first defined sub-area A141 is two thirds the area, located close to the first feature point t10 of the inner canthus, and of an area encircled by the first feature points t10, t11, t12, t13, t14, t15, t16, and t17 of the eye edges after the area is vertically equally divided into three parts. The second defined sub-area A142 is one third the area, located close to the first feature point t14 of the outer canthus, and of the area encircled by the first feature points t10, t11, t12, t13, t14, t15, t16, and t17 of the eye edges after the area vertically equally divided into three parts. The third defined sub-area A143 is an area within the area encircled by the first feature points t10, t11, t12, t13, t14, t15, t16, and t17 of the eye edges and between an edge composed of the first feature points t10, t17, t16, t15, and t14 and an edge gradually extending from the first feature point t10 of the inner canthus to an area between the first feature point t13 of an upper eye edge close to the first feature point t14 of the outer canthus along the edge composed of the first feature points t10, t17, t16, t15, and t14. Reference is made to FIG. 17. In some embodiments, the eye shadow spraying path L31, L32, and L33 may be used respectively to apply eye shadow of three colors. The eye shadow spraying path L31 is applied in the eye shadow makeup area B14 mapped by the first defined sub-area A141, the eye shadow spraying path L32 is applied in the eye shadow makeup area B14 mapped by the second defined sub-area A142, and the eye shadow spraying path L33 is applied in the eye shadow makeup area B14 mapped by the third defined sub-area A143.

Similarly, referring to FIG. 16, the eye shadow defined area A15 is established with reference to the first feature points t18, t19, t20, t21, t22, t23, t24, and t25 of the eye edges. The eye shadow defined area A15 is divided into three defined sub-areas (referred to herein as a first defined sub-area A151, a second defined sub-area A152, and a third defined sub-area A153 below), and eye shadow spraying paths L31, L32, and L33 are extended and constructed such that the first feature points t18, t19, t20, t21, t22, t23, t24, and t25 correspond to the second reference points P18, P19, P20, P21, P22, P23, P24, and P25. In some embodiments, the first defined sub-area A151 is two thirds the area, located close to the first feature point t18 of the inner canthus, and of an area encircled by the first feature points t18, t19, t20, t21, t22, t23, t24, and t25 of the eye edges after the area is vertically equally divided into three parts. The second defined sub-area A152 is one third the area, located close to the first feature point t22 of the outer canthus, and of the area encircled by the first feature points t18, t19, t20, t21, t22, t23, t24, and t25 of the eye edges after the area is vertically equally divided into three parts. The third defined sub-area A153 is an area within the area encircled by the first feature points t18, t19, t20, t21, t22, t23, t24, and t25 of the eye edges and located between an edge composed of the first feature points t18, t25, t24, t23, and t22 and an edge gradually extending from the first feature point t18 of the inner canthus to an area between the first feature point t21 of an upper eye edge close to the first feature point t22 of the outer canthus along the edge composed of the first feature points t18, t25, t24, t23, and t22. Reference is made to FIG. 17. In some embodiments, the eye shadow spraying path L31, L32, and L33 may be used respectively to apply eye shadow of three colors. The eye shadow spraying path L31 is applied in the eye shadow makeup area B15 mapped by the first defined sub-area A151, the eye shadow spraying path L32 is applied in the eye shadow makeup area B15 mapped by the second defined sub-area A152, and the eye shadow spraying path L33 is applied in the eye shadow makeup area B15 mapped by the third defined sub-area A153.

With further reference to FIG. 17, in some embodiments, the blush spraying path L31 may be a single path of passing the eye shadow makeup areas B14 and B15 on both sides. The blush spraying path L32 may be a single path of passing the eye shadow makeup area B14, B15 on both sides. The blush spraying path L33 may be a single path of passing the eye shadow makeup area B14, B15 on both sides.

In this embodiment, the user receives spraying of the eye shadow with the user's eyes closed. Therefore, when the eye shadow is sprayed, the makeup machine 20 first instructs the user to close his/her eyes and then proceeds to spray the eye shadow.

In some embodiments, before the makeup machine 20 captures the facial image 40, the makeup machine 20 can generate a voice notification to notify the user of an instruction message (e.g., a message instructing the user to place his/her head in the facial positioning component as a facial image is about to be captured), or to inform the user of notes and/or cooperation items. After the makeup machine 20 captures (and maps) the facial image 40, the makeup machine 20 generates a voice notification to notify the user of another instruction message (e.g., a message notifying the user that a facial image was captured), or to instruct the user to perform a next operation (such as, a makeup operation).

The user may start a makeup operation by using a makeup button on the makeup machine 20 or the electronic apparatus 10 and by using a makeup button (displayed on a screen 120) provided by executing a makeup application program.

Referring to FIG. 12, when the user presses the makeup button, the control unit 260 receives a start signal indicating that the makeup button is pressed (step S171). Before the step of applying the makeup preparation (step S175 to step S179) is performed, the control unit 260 moves the nozzle 234 of the makeup component 230 to an initial location in response to the start signal (step S173), so as to reduce the time needed for moving the nozzle 234 to the applied location when the step of applying the makeup preparation is subsequently performed. In other words, before the makeup button is pressed, the nozzle 234 is located at a collection location. The initial location is located between the collection location and the applied location.

It should be noted that although the foregoing embodiments describe steps in a particular sequence, the sequence is not intended to limit the present invention. A person skilled in the art will appreciate that the execution sequence of some steps may be simultaneous or performed in an inverse order. For example, the facial image 40 may be first captured (step S130), and then the makeup template 30 is selected/received (step S110).

In some embodiments, the electronic apparatus 10 may be a handheld device, such as, for example, a smart phone, a navigation device (PND), a digital photo frame (DPF), an e-book, a notebook, or a tablet personal computer.

In some embodiments, the control unit 260 may be implemented by a combination of one or more processing units and one or more storage units.

In some embodiments, the foregoing processing unit may be a micro-processor, a micro-controller, a digital signal processor, a microcomputer, a central processing unit, field programmable gate array, a programmable logical device, a state device, a logical circuit, an analog circuit, a digital circuit, and/or any a (analog and/or digital) device based on an operation instruction/operation signal.

In some embodiments, the foregoing storage unit may be a read-only memory, a random access memory, a non-permanent memory, a permanent memory, a static memory, a volatile storage, a flash memory, and/or any device storing digital information.

In some embodiments, the automatic facial makeup method of the present invention may be implemented by a computer program product, so that a computer (such as the makeup machine 20) may complete the automatic facial makeup method according to any embodiment of the present invention after loading and executing a program. In some embodiments, the computer program may be stored on a readable recording medium for the makeup machine 20 to load. In some embodiments, the foregoing program is a computer program product and is transmitted to the makeup machine 20 in a wired or wireless manner.

In conclusion, by utilizing the automatic facial makeup method according to the embodiments of the present invention, a corresponding makeup preparation is accurately applied to a user's face according to a makeup template 30 displayed on a screen 120, so that a makeup effect completed by a makeup machine 20 on the user's face closely resembles a makeup effect represented by the makeup template 30.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An automatic facial makeup method, comprising:
receiving a makeup template, wherein the makeup template comprises a plurality of defined areas and a plurality of makeup instructions relating to application of at least one makeup to the plurality of defined areas, and wherein each of the plurality of defined areas is defined by a plurality of first feature points, wherein each makeup instruction comprises aperture data for adjusting an aperture of a nozzle of a makeup component;
receiving a facial image of a user comprising a facial block having a plurality of second feature points;
defining makeup areas on a face of the user corresponding to regions in the facial block by mapping, for each of the plurality of defined areas, first feature points to second feature points in the facial block, wherein each second feature point has a same relative position on the facial block as a corresponding first feature point;
controlling, by a control unit, the makeup component to adjust the aperture of the nozzle of the makeup component according to the aperture data; and
performing, by the makeup component, a makeup operation according to each makeup instruction on the makeup area corresponding to each makeup instruction and according to the adjusted aperture of the nozzle,
wherein the makeup template further comprises a facial image, wherein the plurality of defined areas are located on the facial image and comprise two eye shadow defined areas, wherein each eye shadow defined area is divided into two or more defined sub-areas.

2. The automatic facial makeup method according to claim 1, wherein each makeup area comprises polygonal coordinate data defined by the second feature points.

3. An automatic facial makeup method, comprising:
receiving a makeup template, wherein the makeup template comprises a plurality of defined areas and a plurality of makeup instructions relating to application of at least one makeup to the plurality of defined areas, and wherein each of the plurality of defined areas is defined by a plurality of first feature points, wherein each makeup instruction comprises aperture data for adjusting an aperture of a nozzle of a makeup component;
receiving a facial image of a user comprising a facial block having a plurality of second feature points;
defining makeup areas on a face of the user corresponding to regions in the facial block by mapping, for each of the plurality of defined areas, first feature points to second feature points in the facial block, wherein each second feature point has a same relative position on the facial block as a corresponding first feature point, wherein each makeup area comprises polygonal coordinate data defined by the second feature points;
controlling, by a control unit, the makeup component to adjust the aperture of the nozzle of the makeup component according to the aperture data; and
performing, by the makeup component, a makeup operation according to each makeup instruction on the makeup area corresponding to each makeup instruction and according to the adjusted aperture of the nozzle, wherein performing the makeup operation further comprises: receiving a start signal; and before the step of applying a makeup preparation, moving the nozzle of the makeup component to an initial location in response to the start signal, wherein each of the plurality of makeup areas comprises a foundation makeup area.

4. The automatic facial makeup method according to claim 3, wherein the foundation makeup area comprises a left cheek makeup area, a jaw makeup area, a right cheek makeup area, a forehead makeup area, and a nose makeup area, wherein the left cheek makeup area is defined with reference to a plurality of second feature points below a left eye, a second feature point of a left nose wing, and a second feature point of a left mouth corner in the plurality of second feature points, wherein the jaw makeup area is defined with reference to a plurality of second feature points of a lower lip line, the second feature point of the left mouth corner, and a second feature point of a right mouth corner in the plurality of second feature points, wherein the right cheek makeup area is defined with reference to a plurality of second feature points below a right eye, a second feature point of a right nose wing, and the second feature point of the right mouth corner in the plurality of second feature points, wherein the forehead makeup area is defined with reference to a plurality of second feature points above a left eyebrow and a plurality of second feature points above a right eyebrow in the plurality of second feature points, and wherein the nose makeup area is defined with reference to a second feature point of an inner left eyebrow corner, a second feature point of an inner right eyebrow corner, a second feature point of an inner left canthus, and a second feature point of an inner right canthus in the plurality of second feature points.

5. The automatic facial makeup method according to claim 4, wherein the makeup instruction comprises a foundation spraying path, wherein the foundation spraying path is utilized for moving left and right in a staggered manner and moving evenly up and down at intervals in the left cheek makeup area, the right cheek makeup area, and the nose makeup area, and wherein the found spraying path is utilized for moving up and down in a staggered manner and moving evenly left and right at intervals in the jaw makeup area and the forehead makeup area.

6. The automatic facial makeup method according to claim 5, wherein the foundation spraying path is a single path utilized for sequentially passing the left cheek makeup area, the jaw makeup area, the right cheek makeup area, the forehead makeup area, and the nose makeup area.

7. The automatic facial makeup method according to claim 3, wherein each of the plurality of makeup areas further comprises a blush area, wherein the makeup instruction further comprises a blush spraying path, and the blush spraying path locates two central point locations according to the second feature point of the left nose wing, the second feature point of the right nose wing, and two second feature points of two eye pupils in the plurality of second feature points and is constructed by each the central point location inside out in a spiral manner.

8. The automatic facial makeup method according to claim 3, wherein each of the plurality of makeup areas further comprises a blush area, wherein the makeup instruction further comprises a blush spraying path, wherein on the blush spraying path, a nose bridge middle line is further established from a middle point between the second feature point of the left nose wing and the second feature point of the right nose wing to a plurality of second feature points of a nose root in the plurality of second feature points, a horizontal reference line is constructed by using a nose tip as a starting point, and two central point locations, a horizontal displacement distance, and a size of blush-applying region are defined according to the nose bridge middle line, the horizontal reference line, and a width between the two second feature points of the two eye pupils.

9. The automatic facial makeup method according to claim 1, wherein the plurality of defined areas comprise a foundation defined area, and the foundation defined area is located on a full-face skin area of the facial image.

10. The automatic facial makeup method according to claim 9, wherein the plurality of defined areas further comprise at least one blush defined area, and each blush defined area is separately located on a left check area or a right cheek area of the facial image.

11. The automatic facial makeup method according to claim 9, wherein the plurality of defined areas further comprise at least one first eye shadow defined area, and each first eye shadow defined area is separately located on a left eyelid area or a right eyelid area of the facial outline.

12. The automatic facial makeup method according to claim 11, wherein the plurality of defined areas further comprise at least one second eye shadow defined area, and each second eye shadow defined area is separately located on the left eyelid area or the right eyelid area of the facial image.

13. The automatic facial makeup method according to claim 12, wherein the first eye shadow defined area and the second eye shadow defined area on the left eyelid area completely or partially overlap.

14. The automatic facial makeup method according to claim 13, wherein the first eye shadow defined area and the second eye shadow defined area on the right eyelid area completely or partially overlap.

15. The automatic facial makeup method according to claim 9, wherein the two eye shadow defined areas are established with reference to a plurality of first feature points of two eye edges in the plurality of first feature points.

16. The automatic facial makeup method according to claim 1,
wherein a first defined sub-area is two thirds of the area, located close to a first feature point of an inner canthus, of an area encircled by the plurality of first feature points of the eye edges after the area is vertically equally divided into three parts,
wherein a second defined sub-area is one third of the area, located close to a first feature point of an outer canthus, of the area encircled by the plurality of first feature points of the eye edges after the area is vertically equally divided into three parts, and
wherein a third defined sub-area is an area within the area encircled by the plurality of first feature points of the eye edges and between an edge composed of the plurality of first feature points of the eye edges and an edge gradually extending from the first feature point of the inner canthus to a first feature point of an upper eye edge close to the first feature point of the outer canthus along the edge composed of the plurality of first feature points of the eye edges.

17. The automatic facial makeup method according to claim 1, wherein the photographing apparatus is a 3D photographing apparatus, and the facial image is a 3D image.

18. The automatic facial makeup method according to claim 17, wherein the makeup template is another 3D image.

19. The automatic facial makeup method according to claim 1, wherein the facial image is from one of a photographing apparatus, a cloud storage unit, a memory storage unit, or an electronic apparatus.

* * * * *